United States Patent [19]

Nichtberger et al.

[11] Patent Number: 4,882,675
[45] Date of Patent: Nov. 21, 1989

[54] PAPERLESS SYSTEM FOR DISTRIBUTING, REDEEMING AND CLEARING MERCHANDISE COUPONS

[75] Inventors: Steven Nichtberger, New Rochelle; Kevin McGlynn, Yorktown Heights, both of N.Y.; Corey Snook, Huntington Beach, Calif.

[73] Assignee: Steven Nichtberger, New Rochelle, N.Y.

[21] Appl. No.: 674,847

[22] Filed: Nov. 26, 1984

[51] Int. Cl.⁴ .................. G06F 7/04; G06F 15/21; G07F 7/00; G07F 7/08

[52] U.S. Cl. .................................. 364/401; 364/479; 235/381; 235/382; 235/493; 235/494; 340/825.35

[58] Field of Search ................ 364/401, 478, 479; 235/381, 382, 487, 493, 494; 340/825.35; 194/2, 4 R

[56] References Cited

U.S. PATENT DOCUMENTS

| | | | |
|---|---|---|---|
| 3,959,624 | 5/1976 | Kaslow | 235/487 X |
| 4,124,109 | 11/1978 | Bissell et al. | 194/4 R |
| 4,186,438 | 1/1980 | Benson et al. | 364/200 |
| 4,247,759 | 1/1981 | Yuris et al. | 235/381 |
| 4,412,631 | 11/1983 | Haker | 221/66 |
| 4,449,186 | 5/1984 | Kelly et al. | 364/401 X |
| 4,554,446 | 11/1985 | Murphy et al. | 235/487 |
| 4,723,212 | 2/1988 | Mindrum et al. | 364/401 |

FOREIGN PATENT DOCUMENTS 0001373 3/1985 World Int. Prop. O. .

OTHER PUBLICATIONS

Sugarman, C. "A Scroll through the Futuremarket", *Washington Post*, May 28, 1986, E1, 4.

Primary Examiner—Clark A. Jablon
Attorney, Agent, or Firm—Darby & Darby

[57] ABSTRACT

Cents-off merchandise coupons are distributed and redeemed immediately and electronically. An electronic display of coupons valid for use in a particular store is presented to customers in that store. When a customer makes a selection of coupons from the display, the selection is recorded. The customer is subsequently identified at a store checkout station as the one who made the selection. In a preferred embodiment, the identification is made by scanning a special card adapted for use with the system. The items purchased in the store by the customer are recorded, and any matches between the coupons selected and the items purchased are determined electronically. The customer is immediately credited in accordance with the terms of the matched coupons. Redeemed coupons are periodically cleared electronically.

25 Claims, 39 Drawing Sheets

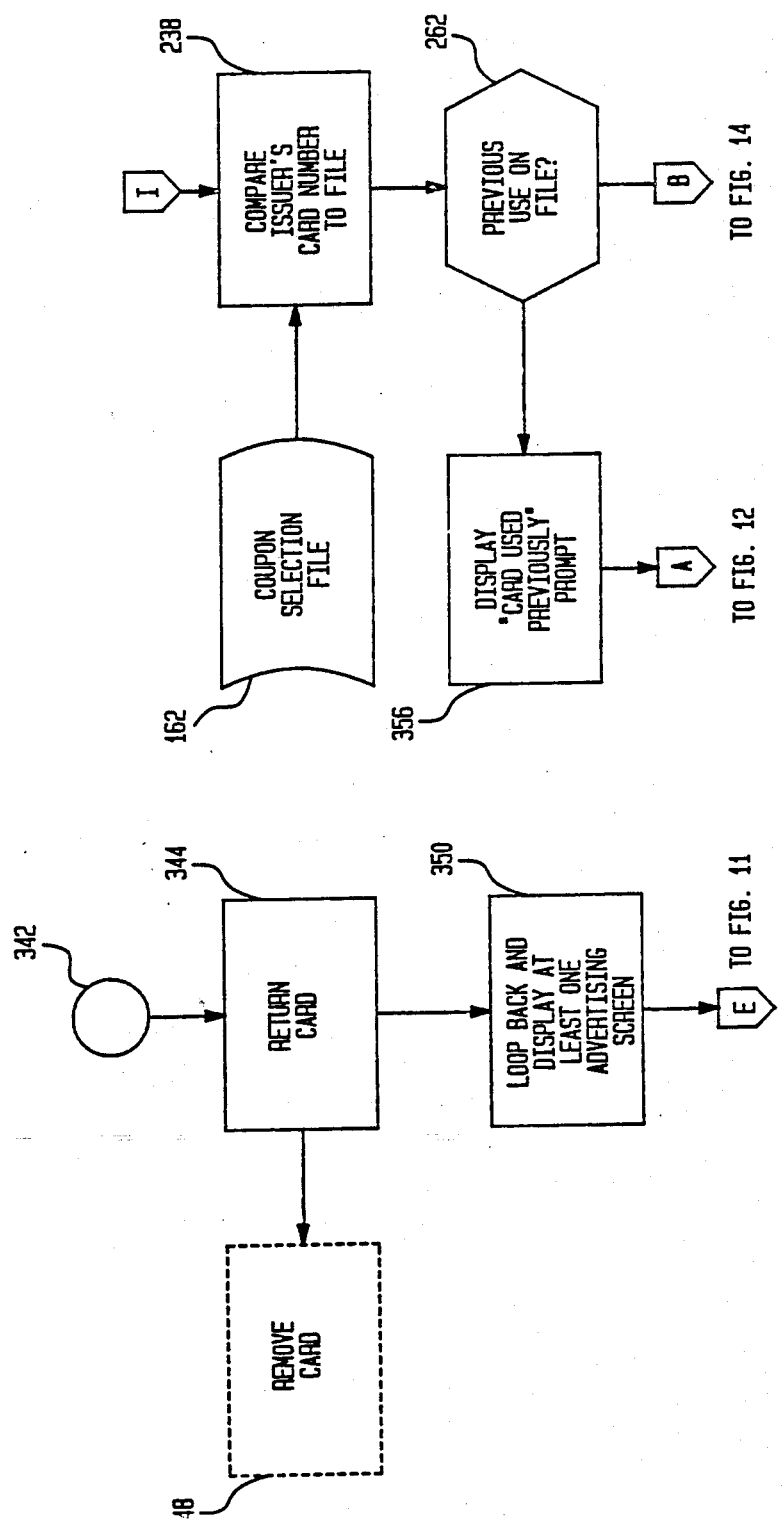

PAPERLESS SYSTEM FOR DISTRIBUTING, REDEEMING AND CLEARING MERCHANDISE COUPONS

This invention relates to the distribution, redemption and clearing of coupons and the like. More particularly, the invention relates to a highly-effective and efficient method and apparatus whereby coupons (such as cents-off merchandise coupons) can be distributed, redeemed and cleared electronically.

BACKGROUND OF THE INVENTION

Coupons are an important marketing tool for many consumer goods and services including, but not limited to, products sold in supermarkets, drugstores and hardware stores. "Couponing" constitutes a substantial business per se and makes an even greater contribution to gross national product by its stimulation of sales of promoted goods and services.

Most coupons offer "cents off" the purchase price of promoted merchandise. There are at present seven major conventional channels plus a few relatively new systems employing mechanized devices for the distribution of cents-off merchandise coupons.

The most widely used and fastest growing conventional channel is the Sunday newspaper free-standing insert (FSI), which accounted for 33% of all coupons distributed in the U.S. during 1983.

Although this means of distribution offers widespread exposure, many of the individuals exposed are not immediately in the market for the promoted merchandise, and the redemption rate typically runs a mere 4.6%, so that by far most of the coupons printed and distributed at considerable cost are effectively wasted. In addition, about 20% of the redemptions are not in accordance with the terms of the coupons. Such misredemptions or fraudulent redemptions may be accidental or intentional on the part of the customer and with or without the connivance of the retailer. In some cases the retailer or personnel employed by the retailer may clip coupons from a newspaper and "redeem" them for personal gain. The cost of misredemptions in the U.S. in 1983 was approximately $350 million. Finally, the retailer's cost of shipping and handling each coupon currently averages an estimated $0.078. This expense is in addition to the costs paid to and borne by other businesses involved in the distribution-redemption and clearing cycle. One such additional cost, which is borne by the coupon issuer, is for making test counts of coupons returned to the issuer by the clearinghouse. This cost amounts to about $0.02 per coupon redeemed and cleared.

This channel of distribution is characterized by the further problem that there is no control, other than the coupon expiration date, which is typically a fairly remote future date, over the timing of coupon redemptions. It sometimes happens that coupon redemptions exceed projections, resulting in excessive coupon expense. Once the coupons are issued, there is little that can be done to protect against this expense.

Another problem characteristic of this channel of distribution is lack of exclusivity. While a particular FSI may offer exclusivity (for example, soap coupons limited to one brand or one manufacturer's brands), other FSIs in the same newspaper may include competing coupons.

Still another problem of this channel of distribution is "double couponing", which is a practice of retailers of giving double (or some other multiple) of the face value of a coupon. The practice of double couponing is an effective marketing tool until all stores in an area double coupon. At that point the competitive advantage is lost and the practice becomes a problem for the retailer. Double couponing costs an estimated 0.66% of supermarket sales, which is clearly a serious matter in this industry, which reports profits of only about 0.85% of sales.

A second mass-media distribution channel for cents-off merchandise coupons is a single offer in a manufacturer's advertisement in a newspaper. This channel accounted for 23% of coupons distributed in 1983.

A third such channel is multiple newspaper offers in a co-op format, which accounted for 15% of coupons distributed in 1983.

A fourth such channel is magazine coupons (not including pop-out type), which accounted for 13% of coupons distributed in 1983.

A fifth such channel is newspaper coupons printed in the body of the paper, which accounted for 6% of coupons distributed in 1983.

The redemption rate for each of the second through fifth channels listed above is less than 4.6%, and the drawbacks of each (misredemptions, expense, lack of control, lack of exclusivity, double couponing, etc.) are as substantial as those described above in connection with the Sunday newspaper free-standing insert.

Another conventional channel of coupon distribution is direct mail, which accounted for 3.8% of coupons distributed in 1983. The redemption rate for this channel is 9.3%, which is higher than the rates for any of the channels discussed previously, but, as compared to those channels, the cost of redemption and exposure to fraud are as great, the distribution cost is far greater, and the other drawbacks are comparable.

In-package and on-package coupons accounted for 6.2% of all coupons distributed in the U.S. during 1983. The redemption rate ranges from 12.7% to 18.1%, depending on the location of the coupon. This is higher than for direct mail, but the shortcomings (misredemptions, expense, etc.) are similar to those described above.

Recently, in-store coupon distribution systems employing mechanical devices have been developed. In these systems, a plastic card (such as a credit or debit card) with a magnetic stripe or UPC code is required to initiate the coupon selection process. The selected coupons are physically issued to the customer in-store and redeemed by the customer at a checkout station after completion of shopping. While the coupon redemption rates for these systems are far higher than for any previous system, misredemptions and the cost of redemptions, clearing and test counting are problems which the conventional mechanized distribution systems do not solve.

Moreover, the current system of clearing coupons which are distributed and redeemed in accordance with any of the methods described above involves physically sending redeemed coupons to a clearing house. The clearing house returns the coupons to the manufacturer (issuer) and issues debits and credits to the manufacturer and retailer, or factors coupons for the retailer. This physical handling of coupons is expensive, cumbersome, error prone and slow.

OBJECTS OF THE INVENTION

An object of the invention is to alleviate the problems of conventional coupon distribution, redemption and clearing systems outlined above and, in particular, to provide such a system whereby redemption rates are increased, the cost of coupon distribution, redemption and clearing is reduced, and fraudulent redemptions of the type that are characteristic of conventional coupon distribution and redemption systems are eliminated.

Other objects of the invention are to provide a system which (a) enables close control over the number and timing of coupon redemptions, (b) makes it possible for a coupon issuer to obtain exclusivity for the issuer's coupons, and (c) eliminates the problem of double couponing.

Still other objects of the invention include, but are not limited to, the following:

to provide a system in which a customer selects coupons at home or upon entering a particular store and redeems the coupons upon completion of shopping in that store or later, but within the period of validity of the coupon;

to provide a system wherein coupon selections by a customer who has properly identified himself are recorded electronically, are later matched electronically with the customer's purchases, and are electronically credited against the customer's bill and entered in the store's accounting system and in a central system that advises and bills the manufacturer;

to provide a coupon distribution and redemption system which is compatible with, or integrated into, an electronic cash register system or an automated checkout (UPC code scanning) system;

to provide a coupon distribution and redemption system which can identify users of the system before they make coupon selections and offer different coupons to different users of the system on the basis of already-obtained demographic data about the users.

A coupon distribution and redemption system according to the invention is characterized by increased impulse sales to new product users, and increased retailer willingness to aggressively merchandise products promoted by the system, since use of the system by the retailer is a source of profit in addition to the profit made on the sales of the merchandise; complete control of coupon distribution and substantial control of coupon redemption, including control of the quantity of coupons distributed per period of time and per location, and control of the time period, quantity and location of redemption; controlled market-by-market consumer awareness programs, including FSI advertising of coupons offered; avoidance of stockouts on heavily promoted items; and avoidance of the need to change the prices on promoted products.

SUMMARY OF THE INVENTION

The foregoing and other objects are achieved in accordance with the invention by providing apparatus for distributing and redeeming coupons and the like. The apparatus comprises display, selection and recording means for presenting to a customer a display of coupons, for enabling the customer to make a selection of coupons from the display, and for recording the selection.

Identification and checkout means is provide for identifying the customer at a store checkout station as the one who made the selection and for recording items purchased in the store by the customer.

Matching and crediting means is provided for determining any matches between the coupons selected and the items purchased and for crediting the customer in accordance with the terms of the matched coupons.

A central processing unit responsive to the matches debits the coupon issuing entity and credits the store with respect to the matched coupons.

BRIEF DESCRIPTION OF THE DRAWINGS

FIGS. 7–40 comprise a flowchart showing the operation of the CDR unit of FIGS. 1 and 5.

DETAILED DESCRIPTION

A. Summary of System Operation

For the purpose of description, the invention is described in connection with the selection (distribution) and redemption of coupons in a store such as a supermarket where, currently, cents-off merchandise coupons are commonly used. As explained in a subsequent section of the specification, other arrangements for selecting/distributing coupons are also contemplated by the invention.

Figure 1:
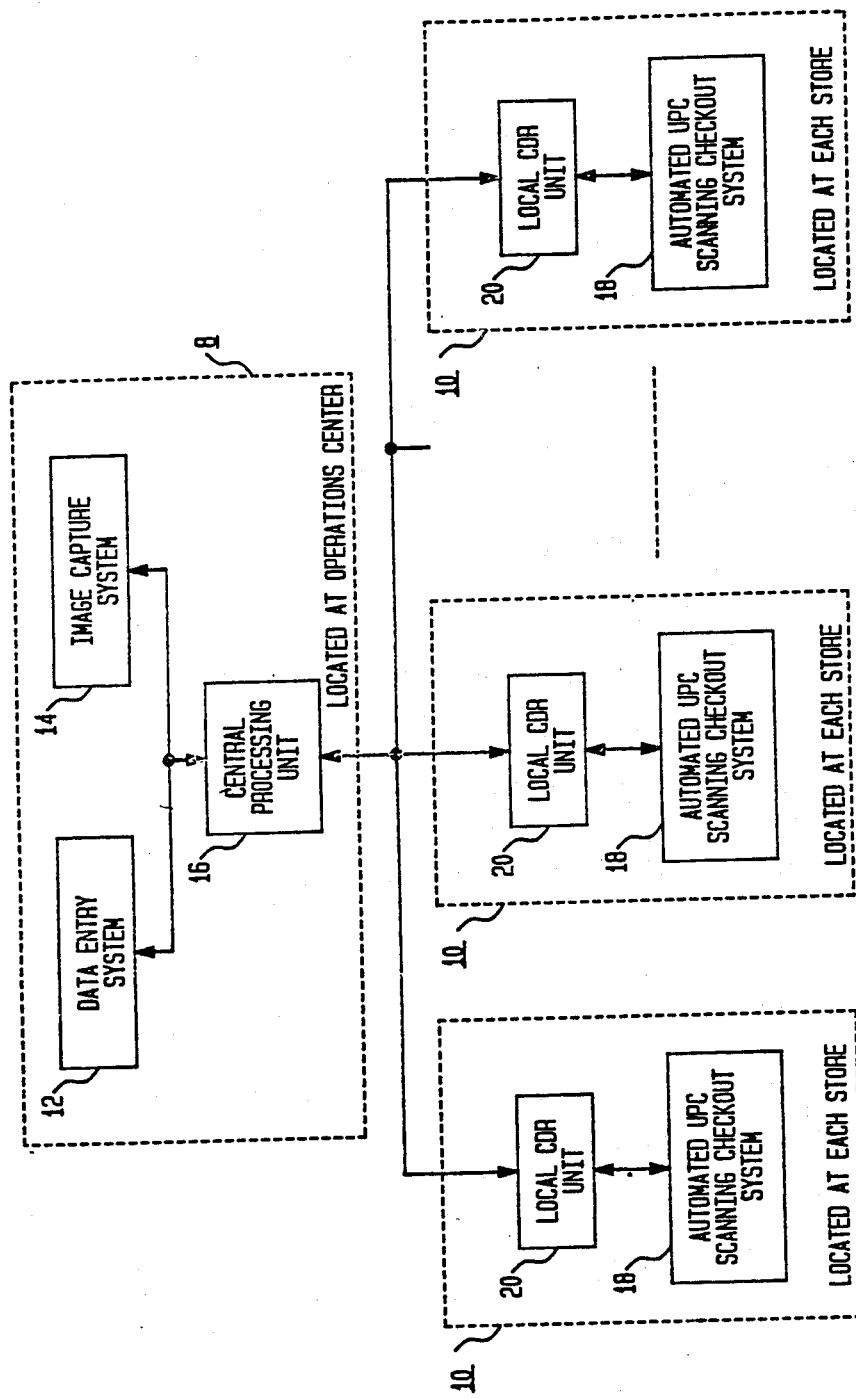
FIG. 1 is a block diagram of the overall system according to the invention.

FIG. 1 represents a system in accordance with the invention. An operations center, shown at 8, cooperates with a plurality of local stations 10. Each of these local stations 10 will be located at a supermarket (in this example) where the coupons are to be distributed and redeemed. The operations center 8 typically will be centrally located with a view toward ease of communication between it and each of the local stations 10. For convenience, only a single operations center 8 is illustrated although the functions of the operations center may be broken up into any desired number of individual centers.

The operations center 8 contains a data entry system 12, an image capture system 14 and a central processing unit 16. The specific functions of each of these units is described below. Generally, the data entry system is used to establish the data base which enables card issuance and the generation (if desired) of various reports on such subjects as, for example, demographic information relating to the individuals who have redeemed the coupons.

The image capture system 14 essentially is responsible for enabling video images of the coupons to be presented at the separate stores. The central processing unit (CPU) 16 has a wide range of functions, generally handling the clearing process controls information flow to the local units and in the operations center itself.

Each of the local stations 10 may be considered to consist of an automated UPC scanning checkout system 18 and a local coupon distribution and redemption (CDR) unit 20. The local CDR unit 20 presents an electronic display to the customer of the coupons which are available for redemption after the customer inserts a card as described below into the unit. The card may include a UPC code which identifies the user and a magnetic stripe on which information can be recorded. The customer then selects the coupons which he or she wishes to redeem. The CDR unit 20 records the selection and makes information identifying the customer and the selected coupons available to each of the checkout stations which comprise the checkout system 18 of the supermarket. A receipt may be printed for the user's convenience, identifying the selected coupons.

After the user has made his or her purchases, he or she goes to one of the checkout stations and presents his or her card to the attendant at the station. The attendant causes the card to be read by a suitable card reader (such as a UPC card scanner) and the checkout system 18 then automatically credits the customer for the coupons the customer has selected where there are corresponding purchases against which the coupons are to be applied.

Thereafter, information regarding the redeemed coupons is transmitted to the central processing unit 16 which then automatically debits the manufacturer who distributed the coupons and credits the supermarket corresponding to the local station 10 at which the coupon was redeemed.

Hence, in the preferred embodiment, selection (distribution), redemption and clearing are accomplished automatically without handling of paper coupons by customer or store and thus without the possibility of the types of fraud which now plague the industry.

In the following portion of the specification, the operations of the individual blocks shown in FIG. 1 are described in detail. There are numerous modifications and embellishments of the preferred embodiment which are possible within the scope of the invention. Some of these are described at the end of the specification in the section entitled "Modifications and Embellishments."

B. Special Card Issuance Summary

Figure 2:
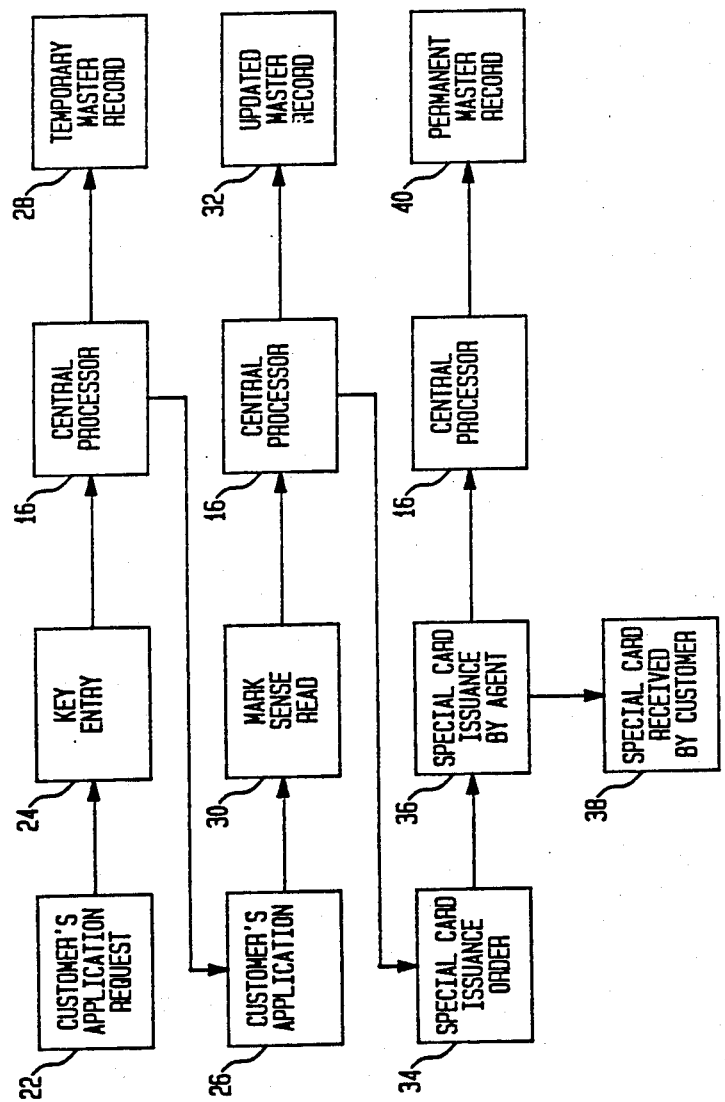
FIG. 2 is a flowchart showing the protocol in accordance with which special cards preferably used in accordance with the invention in lieu of selected magnetic stripe cards are issued.

FIG. 2 is a flowchart summarizing the procedure employed to issue a special card for use with the invention. Preferably, the card will identify the customer (e.g. by UPC code) and include magnetic tracks identifying the customer and on which data can be recorded as described below. As used herein, the term "special card" refers to such a card with the customer identifiable by both UPC and magnetic shripe readers, as opposed to a standard credit card (for example) which today contains a magnetic stripe but generally does not include an UPC code to identify the customer.

Completed requests for applications for a special card represented at 22 are received by mail and from participating merchants. The requests forwarded by merchants may be filled in on the receipts discussed above. They contain the customer's name, address and telephone number and are key-entered as indicated at 24 into the data entry system 12 (FIG. 1). Edit checks verify that all required information is received. A temporary customer number is also assigned. This data is then passed to the central processing unit 16.

The central processor 16 edits the incoming file and compares each record against the customer master file for potential duplications. For each valid new request, an application 26 is generated and mailed to the customer and the "temporary" customer record is added to the customer temporary master file 28.

When completed applications containing the demographic data are returned by the customer, they are read by a mark-sense reader 30 using the previously assigned temporary customer number to eliminate re-entry of the customer's name, address and telephone number. This data is then passed to the central processing unit 16. The central processor 16 edits the incoming file and flags the corresponding temporary records in the customer master file, as indicated at 32, to indicate that the applications have been received. The temporary master file is updated with the demographic data and special card issuance orders are sent by magnetic tape, as indicated at 34, to the card issuing agent 36.

Subsequently, the CPU 16 receives back a tape from the card issuing agent 36 indicating which prenumbered card was actually assigned and mailed to that customer, as indicated at 38. At that time, the record is permanently activated on the master file under the card number assigned, as indicated at 40.

C. Image Capture and Distribution Summary

Figure 3:
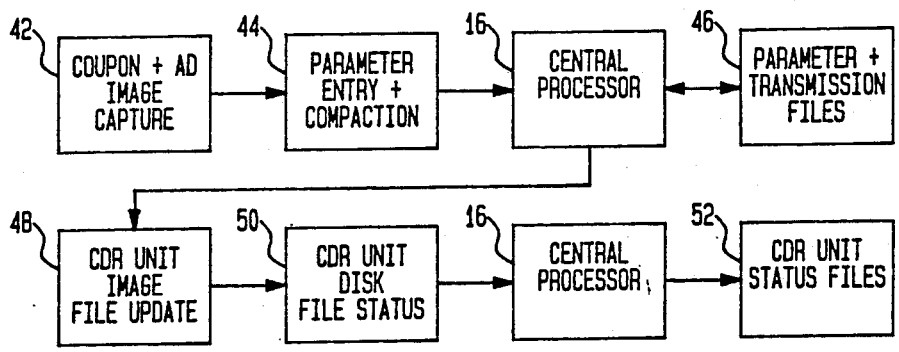
FIG. 3 is a flowchart showing coupon and advertisement image capture and distribution in accordance with the invention.

FIG. 3 is a flowchart showing the operation of the image capture system 14. Camera-ready art work for the coupon displays (and advertising screens) is prepared in the same manner as that used for other common forms of advertising. A digitized image of the art work is recorded electronically, as indicated at 42. Associated parameters such as the number of coupons to be distributed are entered via a terminal device and the graphic data is then compacted, as indicated at 44. The compacted data and associated parameters are passed to the central processing unit 16.

In the central processor 16, the compacted image data is blocked to facilitate its transmission to the local CDR units 20 specified in the parameters. The central processor 16 then transmits the new advertisement and coupon images as necessary, as indicated at 48. CDR unit disk file status 50 is transmitted to the central processor 16 periodically, and this information goes to status files 52. Generally, portions of this data are sent nightly over dial-up telephone circuits or other communication means so that a complete new set of coupon and advertising displays is available to the local CDR units each period. Much of the data is identical for each "region" usually so that the operations center has positive confirmation as to which transmissions have been properly received and filed by each CDR unit 20 consisting of between fifty and five hundred terminals. However, provision can also be made for entry of data locally into the CDR's when and where such is advantageous. At 1200 baud, the data loading takes approximately 12 hours each week, although this time can vary based on image quality, number or images and practical limitations on data compression. Using 2400 baud reduces the update time correspondingly. Either rate is fast enough to enable updating of the system during late night hours, which is especially advantageous if it is otherwise impossible to complete the update without interrupting use of the unit 20. Compacting the data also reduces update time.

C. The Data Entry System

The data entry system 12 (FIG. 1) utilizes standard key-to-disk hardware. The system may comprise a minicomputer with appropriate amounts of memory and disk space for the number of terminals required. While a communications link with the central processor 16 is a general requirement, an optional tape drive may be necessary under certain unusual conditions. Likewise, printing support for the data entry function (operator productivity reports, etc.) will generally be provided by the central processor 16.

Mark sense readers, similar to those used to grade multiple choice examinations, are preferably used to capture data from most of the completed applications for special cards.

Data entry software includes programs and utilities to create batch header records, format screens, perform basic editing functions and monitor operator productivity. The software also facilitates specialized edit functions, assignment of temporary customer numbers, etc.

The data entry system 12 supports the various data capture functions associated with creating and maintaining a data base of special card customers. As such, it is used primarily to process customer input such as application requests, applications, address changes, special card re-issuance requests, etc.

Requests for applications are received by mail and from participating merchants. They indicate the customer name, address and telephone number, which must be key entered. In addition, completed applications may be key-entered by some customers directly into the local CDR unit 20.

A header record must also be produced for each batch of application requests, indicating constant information such as:
 date
 batch number
 type of work
 operator identification and, if applicable,
 merchant identification.

The data entry system must preferably edits the data and assign a unique temporary customer number to each request for application entered into the system. The file is then passed to the central processor 16 (FIG. 1).

Completed applications contain the following information in machine readable form: temporary customer number (assigned previously), confirmation that the printed name, address and phone number are correct, and demographic data.

Corrections to name, etc., must be key entered.

A header record should also be produced for each batch of applications, indicating information such as date, batch number, type of work and operator identification.

The data entry system 12 preferably edits the data and passes it on to the central processing unit 16.

Other miscellaneous communications requiring data entry support to update the master file include:
 Change of address notices
 Lost, stolen or mutilated card reports
 Returned mail cancellations (card undeliverable)
 Replies to requests for supplemental information.

Header records similar to those above will also normally be required for these transaction types to minimize key entry of constant data.

D. Image Capture System

The image capture system 14 is microprocessor-based although best driven systems may also be used. The basic components include the microprocessor with appropriate disk capacity, a color camera capable of capturing a color image and a color terminal display to control its operation and display results. The device may attach locally to the central processing unit 16 to facilitate the substantial communications requirements involved.

The software provides the basic capabilities of the system and associates parameter data such as screen number and location on the screen entered via the terminal with the corresponding image record.

Finished art work for both coupons and advertising displays is captured in digital form. The system then performs the following tasks:
 Perform run length encoding or other suitable compaction
 Accept and associate parameters for text overlays
 Accept and associate parameters for coupon usage
 Accept and associate parameters for ad usage
 Display results of image digitization for evaluation
 Pass data to the central processor 16.

E. Central Processing Unit

An IBM 4300 series unit is suitable for use as the central processing unit 16. Depending upon the number of customer records and local CDR units 20 supported, the CPU 16 generally requires about two megabytes of RAM memory, approximately 500 megabytes of disk storage, a tape drive and a printer. Various communications devices and modems are also required.

A number of intermediate systems may be provided if desired to assist in the task of communicating with a multiplicity of CDR units 20.

The central processor 16 utilizes standard communications, data base and statistical analysis software to the maximum extent possible.

The central processor 16 performs a variety of processing, control and communications functions including:
Application requests: On a daily basis, the CPU 16 receives a handoff from the data entry system 12 containing new requests for applications and their associated header records. The system then performs the following tasks:
 Append necessary header data to each record
 Print edit failures
 Print input summaries/controls
 Print operator productivity reports
 Search for and flag records already on the master file
 List flagged requests for application
 Add others to master file under temporary number
 Print applications/mailers
 Print report of merchant submissions
 Credit merchant's "account" for submissions if retailers are to be paid a fee for collecting and submitting applications.
 Delete temporary master records if application not received in 90 days. Applications: On a daily basis, a handoff will be received from the data entry system containing new applications and their associated header records. The system then performs the following tasks:
 Append necessary header data to each record
 Print edit failures
 Print input summaries/controls
 Print operator productivity reports
 Search for corresponding temporary records
 List applications not matched
 Add application date and demographic data to others
 Write card issuance orders Create daily tape for card issuance agent
Print follow-up report if card not issued in 5 days.

In a similar manner, other types of input are received from the data entry system 12. Each must be processed in an appropriate manner. The following tasks are required:

Append necessary header data to each record
Print edit failures
Print input summaries/controls
Print operator productivity reports
Search for corresponding records
List input not matched
Update other records as necessary.

Periodically, new images (graphic representations of the product) in digitized form are received from the image capture system along with the following parameters for each:

Product name
Short product description (coupons only)
Long product description (ads only)
Prize description (special coupons only)
Savings amount (coupons only)
Expiration date (coupons only)
CDR units 20 designated to receive data (individually or by region)
Start and end dates for use
Screen number
Position on screen (coupons only)
Coupon identification number (coupons only)
Advertisement identification number (ads only)
Number of coupons to be issued (coupons only)

Optionally, the entire coupon screen may be digitized as a single unit. Preferably, coupons are digitized individually. As the terminal base grows, further reductions in communications requirements can be achieved by creating standard, graphic formats for coupons which will be maintained by each CDR unit 20. At that point, only the unique portions of each coupon will require digitization and transmission.

Special software to control the random distribution of special coupons is provided. For promotional reasons, their redemption may be handled manually.

The central processor 16 performs the following tasks associated with passing this data to the CDR units 20:

Retain usage parameters
Verify usage parameters are not conflicting or incomplete
Divide data into blocks to allow partial transmissions
Broadcast blocks of data to CDR units 20
Poll CDR units 20 for blocks received
Retransmit as necessary
Retain transmission status for each CDR unit 20
React to changes in status reported by maintenance personnel Preferably, the system similarly updates the software in each terminal. Optionally, pre-initialized disks may be used for installations and replacements.

Periodically, the central processor 16 calls each CDR unit 20 to collect redemption data for processing. This data includes:

Special card number and transaction number
Redeemed coupons

Optionally, the central processor 16 also collects data on other products purchased (without coupons) for selected customers. Such data could include product code, quantity, price, etc.

In addition, header information will also be received which includes:

Business day
Identification of CDR unit 20
Special coupons issued
Summary of coupons issued and redeemed
Paper low and internal test sequence results
Current disk data and program status
Preferably, this data also includes utilization and additional maintenance status information.

Tasks relating to the collection of processing data include the following:

Poll each CDR unit 20 for redemption data
Maintain redemption data status (all days received)
Edit incoming data (including modulus check)
Print edit failures
Append necessary header data to each record
Add coupon values based on parameter table
Add merchant identification based on local CDR unit 20 identification
Add manufacturer identification based on parameters
Debit manufacturer's "account" for redemptions
Credit merchant's "account" for redemptions
Output details for manufacturers and retailers
Print activity and control reports
Maintain status of special coupon distribution
Maintain balances of merchant and manufacturer "accounts"
Store transaction data for future investigation
Store historical data on parameters, accounts, etc.
Preferably, processing tasks also include:
Search for corresponding master record if special card was used
Print match failures
Update master record for others where appropriate
Periodically retrieve data on active accounts
Perform analytical routines
Produce corresponding output for manufacturers
Periodically purge master of old transaction data
Periodically purge master of inactive accounts
Print purge reports.

Many reports may be produced on a COM (computer output microfilm) tape for delivery to a microfiche vendor.

The central processor 16 also supports a number of miscellaneous functions, primarily by providing various types of inquiry and update capability via terminal devices.

F. Coupon Distribution and Redemption Summary

Figure 4:
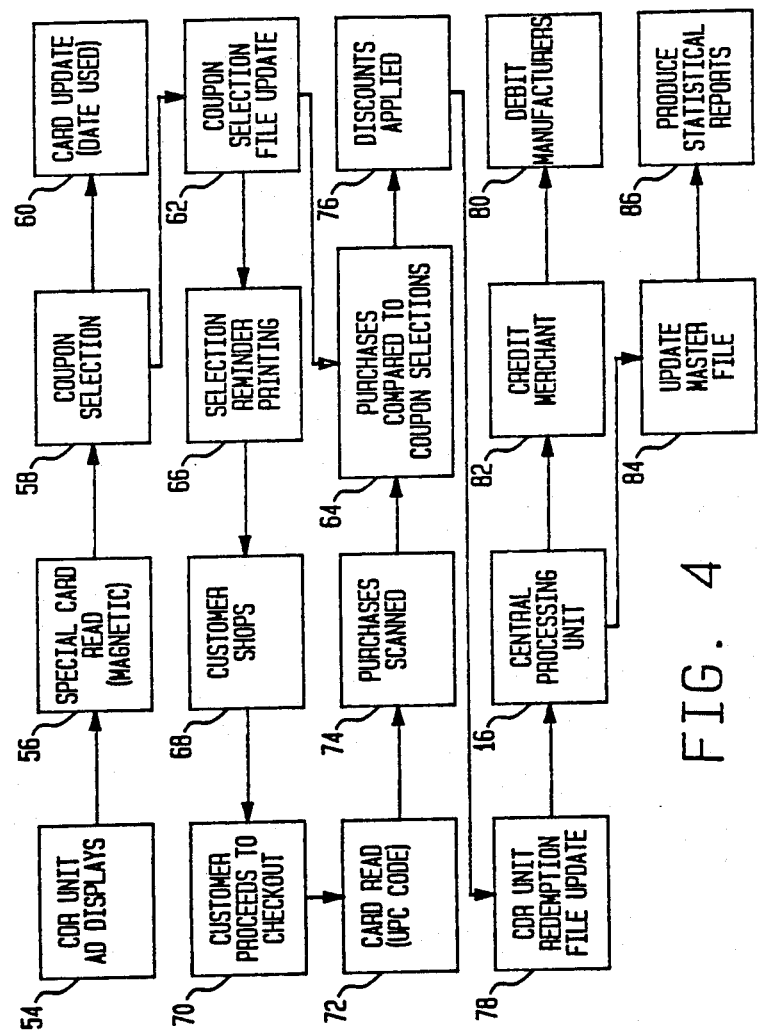
FIG. 4 is a flowchart illustrating coupon selection and redemption in accordance with the invention.

FIG. 4 is a flowchart illustrating coupon selection (distribution) and redemption. Customers using a CDR unit 20 are initially presented with advertisements, in a repeating sequence indicated at 54. The maximum length of an ad or similar filler display is preferably about 20 seconds. In order to ensure that the ads, etc., are shown even when the unit 20 is constantly in use by consumers accessing coupons, the next sequential ad or filler display is preferably shown periodically, such as after every fifth user. In this case, the user sees a footnote in the display advising that the unit 20 will be ready to accept a card in a few seconds. Normally, the ad program runs until a card is inserted into the magnetic card reader.

When a special card (as opposed to other magnetic stripe cards which may be allowed to actuate CDR unit 20 for a limited period of time after installation) is properly inserted into the card reader, a fifteen digit number and two digit security code on the card is read from a selected track of the card. Immediately after recognizing the card as a special card, the reader checks an area on the card designated for indicating when the user previously accessed coupons in that type of retail outlet.

Thereafter, there are several possibilities. In one embodiment, if the notation indicates that the user accessed the system in that type of retail outlet during that week (or other predetermined time period), a single screen appears explaining the reason that the card is not valid in that type of store for the remainder of the week (or other time period).

If the user's last access to the coupons in that type of retail outlet was not during the most recent week, the customer may proceed to select coupons.

Each coupon screen is filled with between one and twenty-four coupons. The user has preferably about fifteen seconds to choose coupons, or to touch the "hold" or the "next" space, before the next screen filled with coupons is displayed. If the "hold" space is touched, the user has preferably a total of about thirty seconds to choose a coupon from that screen. If the "next" space is touched, the next screen filled with coupons is immediately shown. If a coupon is chosen, that choice is noted under the user account number, and under a counter that counts the number of each coupon distributed. If the counter determines that the limit number of a particular coupon has been reached, that coupon is automatically removed from the system and is not thereafter displayed (unless, of course, appropriate new instructions for such display are received from the CPU 16). The user is then presented with the next screen filled with coupons. The process is identical for each screen.

After the last screen is seen, and a user decision made, the "account choice" record is created, and a receipt or shopping list may be printed. The receipt includes a receipt number, the product name and size, and the savings amount. It is used as a reminder to shoppers and can be used to identify the users of cards which are not special cards at checkout time. If a special card is used, a notation to that effect, including the period of such use, is magnetically recorded on the card, as indicated at 60. The customer's coupon selections are entered in a file, as indicated at 62.

Coupon selection information is reported via a communications link to the local processor which controls the store's automated checkout (UPC code scanning) system, as indicated at 64. This facilitates a subsequent comparison of coupons selected to purchases made.

During the introductory period, customers without a special card will instead be allowed to utilize selected cards having a magnetic stripe to activate the CDR unit 20. In this case, the number printed on the receipt or coupon selection reminder can have operational significance if the receipt does not bear the account number and if the card does not display the account number in UPC code format. The customer shops as indicated at 68, and proceeds to the checkout station, as indicated at 70. Since the reminder bears the number under which the customer's selections are filed by the CDR unit 20, it is presented at checkout time in lieu of the special card.

Figure 5:
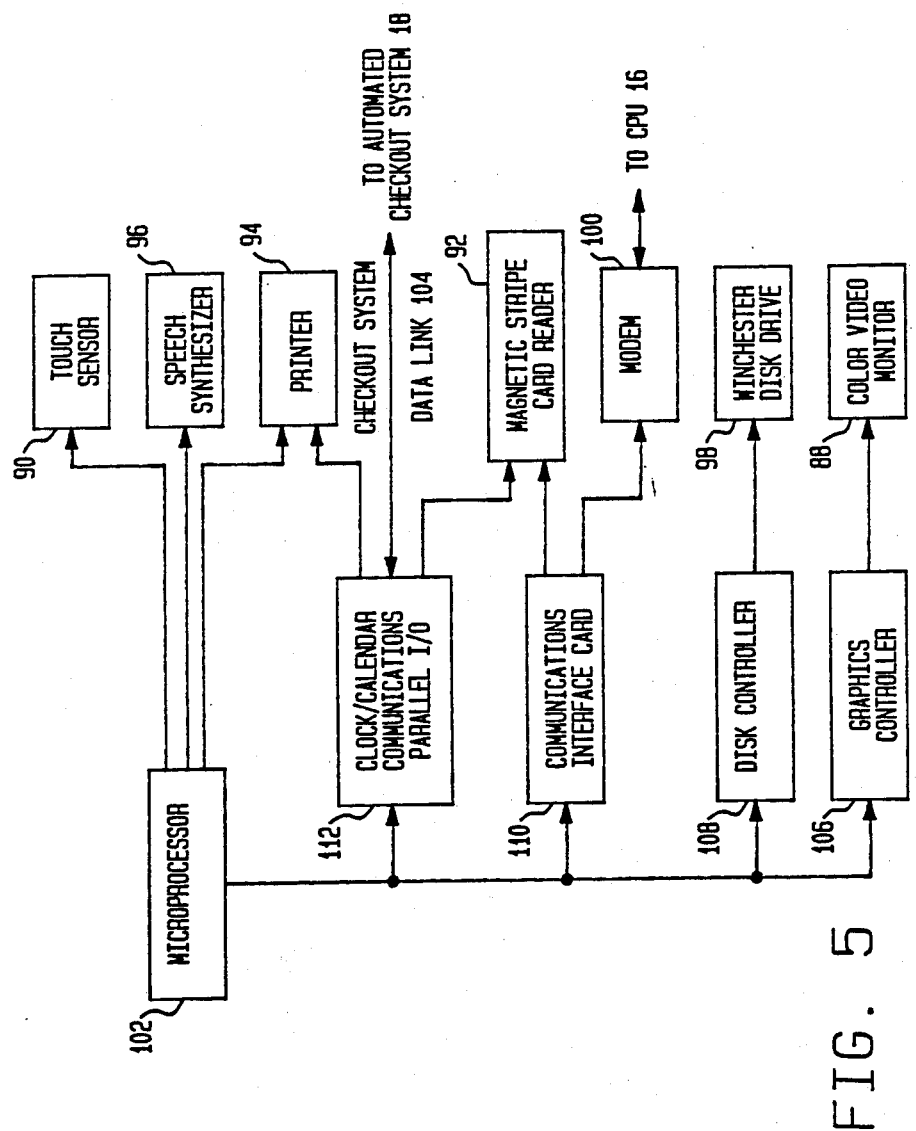
FIG. 5 is a block diagram of a local coupon distribution and redemption (CDR) unit constructed in accordance with the invention.

The functional objectives of the CDR unit 20 can be achieved through various hardware and software configurations. As one example, the CDR unit 20 may comprise a five foot high metal enclosure, on the front panel of which are mounted a color video monitor 88 (FIG. 5) with a touch screen sensor 90, a magnetic stripe card reader 92 and a coupon selection list printer 94, all within easy reach of a standing adult. The enclosure may also contain a speech synthesizer 96. The components of the CDR unit 20 interrelate to perform the various functions required of the terminal under control of a microprocessor 102 (FIG. 5). Programs and data files (including screen images) are stored on a Winchester disk 98. A modem 100 is used to communicate with the central processing unit 16 and a communication link 104 transfers transaction data between CDR unit 20 and the local checkout system controller. Speech synthesis may be used to enhance the appeal of CDR unit 20 and to provide guidance through the selection process.

When a card is inserted into card reader 92, the device reads the customer number and expiration date encoded on one of the magnetic tracks on the card in ABA format. A security code may but need not be included. It also reads a transaction date or time period code which was encoded on the other track in IATA format during the previous transaction, possibly along with other details of prior transactions, or other data. When the customer's identity and usage period have been validated, he is presented with a screen of coupon choices from which to make a selection. When he has completed the selection, a new date or time period code is encoded on the card, possibly along with other data, and the card is returned to the customer. The card reader 92 interfaces with the microprocessor 102 via any number of means including a serial data path with a number of status and control lines.

The preferred characteristics for the magnetic stripe card reader 92 are reliability of operation and ease of use by untrained operators. One such suitable reader is model MTM-290-3A available from SRD Corporation, Chiyoda-Ku, Tokyo, Japan. The specifications include Reads and encodes all three ISO standard tracks
Encoding Density:
 Track 1: 201 BPI
 Track 2: 75 BPI
 Track 3: 210 BPI
Card Speed: 430 mm/sec
Card feed time: approx. 1 second for 1 round passes
Life: 500,000 passes
Power: 5 V, 12 V
Size: 8.4"×3.5"×2.6"
Weight: 1.8 lb.

The color video monitor 88 is used for three distinct purposes. It is used to give the customer instructions on the use of the terminal 20 and the status of his card, to present an advertising campaign, and to present screens of coupons for the customer's selection.

The important characteristics of the color video monitor 88 are size, spatial resolution, color resolution and freedom from flicker. One such suitable monitor is model Color 710 of Amdek. The specifications include the following:
 size: 12" diagonal
 RGB analog input
 0.31 mm dot pitch
 720 (H)×480 (V) resolution
 15.75 kHz horizontal scan
 Etched (non-glare) CRT
 Long persistence phosphor The color video display graphics generator 106 is used to convert a data file from the disk into the appropriate red, green, blue (RGB) analog signals and to generate synchronization signals for the color monitor 88. It may also be used to overlay the graphic images with text.

The important characteristics of the color graphics generator 106 are the spatial resolution, color resolution, color selection and speed of displaying an image from a disk file. One such suitable generator is model Cono-Color 40, available from Conographic Corporation, Irving, Calif. The specifications include:

Spatial resolution: 640×400 pixels
Color resolution: 16 out of 256
Color construction: 3 red, 3 green, 2 blue bits/gun
Display memory: 128k bytes
Field rate: 60 Hz minimum
Refresh rate:
  Interlace: 2 field cycles
  Non-interlace: 1 field cycle
Outputs: Analog RGB, IRGB, optional NTSC video
IBM PC compatible interface
Includes CIOS and CURVE software (with text insertion)
Alphanumeric formats:
  40×36
  80×36
  64×51
  40×25
  80×25

The touch screen sensor 90 is used by the customer to indicate his coupon selections and to control the screen advance. The customer selects one or more coupons per screen or indicates "no selection." At that point the next coupon screen is presented. If selection response is not received within a prescribed number of seconds and hold instruction is not touched by the customer, the next screen is automatically presented and no selection is recorded. The important characteristics for the touch screen are reliability, ruggedness and compatibility with a safety shield. One such suitable scanner is available from Electro Mechanical Systems, Inc., Champaign, Ill. The specifications include:

32×40 resolution
  Controller on one of four frame boards
  Infrared light emitting diode (LED) technology
  Light and noise reduction circuit The speech synthesizer 96 may be used to enhance the customer appeal of the CDR terminal 20 by providing friendly assistance and prompts to the customer. It may also be used to attract attention to the advertising when the terminal 20 is not actively being used by a customer.

The speech synthesizer 96 accepts ASCII text or phoneme codes and is capable of operating from a dictionary. One such suitable synthesizer is the Echo Speech Board, available from Street Electronics Corporation, Carpenteria, Calif. The specifications include:

Programs contained in on-board ROM
  Serial RS-232 operation
  Uses Texas Instruments TMS 5220 speech processor
  2K RAM
  Accepts ASCII text, phoneme codes or message number inputs
  Size $3\frac{5}{8}"\times 4\frac{7}{8}"\times 1"$
  On-board power supply circuitry
  Contains 500 mW audio amplifier When the customer has completed the selection of one or more coupons from each of the available coupon screens, a list of his selections is printed by the printer 94 and dropped into a coupon selection list dispensing tray so that he will be reminded of the savings he can realize on the selected items as he shops. He is assigned a receipt number which is printed on the coupon selection list. That receipt number allows the system to match up the customer's selections with his purchases to effect a redemption at checkout time in lieu of the special card. The printer uses a 3.25" wide continuous folded form. The paper supply normally lasts more than two weeks, and a sensor signals when paper is low. The paper-low signal is recognized by the microprocessor 102 and forwarded to the central processing unit 16 as part of the terminal status report. The paper-low and other terminal status indications may also be displayed for service personnel.

The important characteristics of the printer 94 are reliability; infrequency of service; absence of need for operator interaction or knowledge; high speed and the ability to print graphics. It is desirable to incorporate a paper cutoff mechanism, long continuous-feed paper supply, and an optical form sensor. One such suitable printer is model 2285 with knife and driver/option board, available from NCR Corporation, Ithaca, N.Y. The specifications include:

Printing method: dot matrix impact
  Print speed: 200 lines/minute
  Line feed: 0.030 seconds
  Columns: 40
  Paper width: 3.25"
  Paper thickness: 0.0027"–0.0042" (0.014" max. total)
  Fonts: 7×7, 7×9 and graphics
  Line height: 5.6 or 7.5 lines/inch
  Form feed: 5 inches/second (line feed)
  Print head: 7-wire, clapper
  Print wire: 0.015" diameter
  Physical: 5.4"×6.5"×5", 4.1 lbs.
  Ink Ribbon: 50 ft. Nylon cassette, 10 million character life.
  Print head life: 150 million characters
  MCBF(C): 15 million print lines
  Operating temp: 0°–50° C. (32°–120° F.)
  Humidity: 5–90% relative humidity The Winchester disk drive 98 is used as the storage device for program and data files. Screen images occupy a significant portion of the data files. Each time a new screen is required, it is read from the disk 98 into semiconductor memory where it can be converted by the graphics controller into the screen image. Transaction data is also stored on the disk 98 for later transmission to the central processing unit 16. The disk drive 98 is environmentally sealed to prevent contamination which might affect reliability.

The important characteristics of the Winchester disk drive 98 are reliability and capacity. One such suitable drive is model RO 203, available from Media Distributing, Scotts Valley, Calif. The specifications include:

Capacity: 20 MB unformatted, 15.75 MB formatted
  Transfer rate: 5 m bits/s
  Seek times: 90 ms average, 210 ms max.
  Average latency: 8.3 ms
  Flux reversals per inch: 8720, max.
  Tracks per inch: 360
  Rotational speed: 3600 RPM
  Power required:
    5 V at 0.7 A
    12 V at 2A typical (4A motor start)
  Dimensions: 8.00"×5.75"×3.25"
  Shock:
    Operating: 3 g pk. less than 10 ms., max 2/sec Non-operating (with transit lock): 20 g pk
Interface: ST506
Built in test (BIT): Performed by on-board microprocessor
Seek errors: less than 1 in each 5 million seeks
MTBF: Greater than 12,000 hrs. (excluding first 50 hours)
MTTR: 0.5 hours
Drive service life: 36,000 power-on hours, minimum A disk controller 108 is used to control the operation of the disk drive 98. It also serves to encode and decode the data signals and to format the data so that it can be easily and reliably accessed. The controller preferably supports bad track remapping and error detection and automatic correction to assure data integrity. One such suitable controller is model DTC-5150, available from Arrow Electronics, distributor for Data Technology Corporation, Santa Clara, Calif. The specifications Operates on the IBM 5150 bus
Error detection and correction up to 4-bit bursts
Supports alternate disk track assignments
Supports DMA
6 levels of vectored interrupt
Automatic seek and verify
Controller and disk fault detection
Sector buffer The modem 100 is used to communicate with the central processing unit 16 over the dial-up telephone network (DDN). The modem is designed to operate at 300, 1200 and 2400 baud (bits per second) and to operate either in the synchronous or the asynchronous mode. It complies with the V.22 bis and V.22 A,B standards to provide compatibility with a variety of host modems. 2400 baud operation is preferably used whenever the telephone line quality will support it. 1200 baud operation is an acceptable fall-back. The modem 100 interfaces to the microprocessor 102 via a serial communications interface card 110 which is also capable of supporting the above modes and baud rates. Screens, programs and data are downloaded from the central processing unit 16 to the Winchester disk 98 and transaction data and terminal status are returned to the central processing unit 16, all via the modem 100.

The preferred characteristics for the modem 100 are 1200 and 2400 baud rate, auto-dial and auto-answer features and board-level OEM configuration. In order to provide reliable communications and to reduce telephone connect charges, a modem is preferred which is capable of conforming to the V.22 BIS standard for 1200/2400 baud operation. The existence of this fairly recent standard assures the availability of multiple sources for the modem in both the terminal 20 and for the CPU 16. One such suitable modem is model R2424DC (with DAA), available from Rockwell International Semi-Conductor Products Division, Newport Beach, Calif. The specifications include:

CCITT V.22 bis, V.22 A,B compatible
Bell 212A and 103 compatible
Synchronous: 2400 bps, 1200 bps, 600 bps +0.01%
Asynchronous: 2400 bps, 1200 bps, 600 bps +1%, −2.3%, 0-300 bps
2-wire full-duplex
Auto/manual answer
Auto/manual dial, tone or pulse
Power +5 V, +12 V, −12 V, 3 Watts typical
Size: 3.937"×4.725"

The microprocessor 102 provides the control for the other components of the terminal 20. It executes the terminal software and interfaces directly or indirectly with all the other electronic components. Associated with the microprocessor 102 is a semiconductor random access memory (RAM) in which the currently executing program is stored along with data to which it requires very fast access. Also associated with the microprocessor 102 is read-only memory (ROM) to hold the power-on (bootstrap) program load and diagnostic routines. The microprocessor also uses interrupt timers and direct memory access (DMA) to facilitate input/output (I/O) operations.

The important characteristics of the microprocessor 102 are compatibility with the color video display graphics and availability of a cost-effective combination of I/O ports required to communicate with the various peripherals. One such suitable microprocessor is model FE 6400/256, available from Faraday Electronics, Palo Alto, Calif. The specifications include:

256k parity checked RAM
8088 CPU
32k EPROM space
4 DMA channels (one is for refresh)
3 timer channels (one is for refresh)
8 levels of interrupt
1 parallel printer port, Centronix interface
2 serial ports, 8250 UART
IBM compatible keyboard port
Reset port
5 IBM compatible expansion slots
DOS BIOS included on EPROM
Size: 8.5"×12"
Operating temperature: 0–55 degrees C. (32°–131° F.)

| Power: | |
|---|---|
| +5 V | 3 A |
| −12 V | 50 mA |
| +12 V | 50 mA |
| (−5 V not required by FE6400) | |

The communications cards 110 are used to provide serial communication interfaces for the modem 100, for communication to the checkout system 18, and for the magnetic stripe card reader 92.

The system may require, under certain circumstances, two communications cards. Among the suitable cards available are model CC-232 available from AST Research, Inc., Irvine, Calif. The specifications Supports async, bisync and SDLC/HDLC
Baud rates: 50 to 19,200
Configuration: DTE or DCE
Number of ports: 2
Uses Zilog SIO processor A clock/calendar combination card 112 contains both a time-of-day clock and a calendar with rechargeable battery backup. This is used as a date reference for the CDR terminal 20 for periods of time when it does not communicate with the central processing unit 16. It also may contain a serial communications port which could be used to support the asynchronous data link 104 to the checkout system 18 and a bidirectional parallel port which could be used to support the sensors and control of the magnetic stripe card reader 92 and the printer 94.

One such clock/calendar card is the Combo Card supplied by Apparat, Inc., Denver, Colo. The specifications include:

Clock/calendar with battery backup
Parallel I/O port: 8 limbs with handshaking
Special I/O port:
  Asynchronous
  50–9600 band
  RS232

A power supply (not shown) capable of supplying the necessary regulated voltages will be required. One such suitable power supply is the Model 5110-1 supplied by Power General of Canton, Mass. The specifications are:
Line regulation:
  $-+-$ 0.1%
Load regulation:
  $-+-$ 0.2%, +5 V output
  $-+-$ 1% auxiliary output
Ripple and Noise (Typ.):
  50 mV p-p, +5 V output
  10 mV RMS, all outputs
Holdup time: 16 msec
Operating temperature: 0 degrees C. to 70° C.
Output current:
  +5 V at 10 amps
  −5 V at 1 amp
  +12 V at 1 amp
  −12 V at 1 amp
  +24 V at 2.5 amps
Size:
  $4'' \times 9'' \times 1.7''$

B. The Checkout System/Clearing

At the checkout counter, the customer presents his special card or reminder (and, if appropriate, completed request for application) before the product checkout process begins. This is analogous to the conventional practice of presenting coupons before checkout begins. Since the special card also bears the customer number in "UPC" bar code format, it can be read automatically by the store's scanning system, as indicated at 72 (FIG. 4). The cash register's UPC keypad is used as an alternative method of identifying the customer and calling up the customer's coupon selections if the special card fails the scanner read or if a customer who does not hold a special card presents a receipt or coupon selection reminder during the introductory promotion. Key entry of the receipt number or the card number will retrieve the needed information. The UPC codes of items customers purchased are scanned or key-entered into an electronic cash register, as indicated at 74.

Upon recognizing that a special card or receipt number has been scanned or key entered, the store's local processor requests the corresponding list of coupon selections from the CDR unit 20. The cash register terminal (or local processor) compares the customer's selections with the products actually being purchased, as indicated at 64, and applies credit accordingly, as indicated at 76. All discount transactions are reported to the store's accounts receivable system, electronically or otherwise, to properly account for coupons awaiting reimbursement. Further, coupons actually redeemed by each customer are also reported back to the CDR unit 20.

The ability to process coupon redemptions after individual item checkout (but before totalling) is a desirable feature. However, this may not be compatible with the design of some conventional checkout systems, especially since they must also process standard paper coupons. Similarly, while it is desirable to list items for full price and print itemized entries for each discount at the end of the register tape, the existing architecture of some conventional checkout systems may prevent it. (Sales tax, in this case, must be calculated, or adjusted, after coupon redemption and before totalling.)

Upon receipt of redemption data from the checkout system's processor, the CDR unit 20 stores this information in a file of redemptions by customer, as indicated at 78. Later, the local CDR unit 20 is called by the CPU 16 and this file is transmitted to the CPU 16.

Selected "coupons" may remain on the file for up to six days given that a seven day interval between uses of the special card is preferably defined. The interval between uses may be varied as desired, and the period during which selected coupons may remain on file may be varied correspondingly. Likewise, partial redemptions may be added as a feature, allowing customers to use some of their "coupons" immediately and others later in the six day period. After six days, the CDR unit 20 preferably purges unused "coupons."

All of the information concerning coupons distributed and coupons redeemed is electronically sent to the operations center CPU 16 for processing. In accordance with the invention, the operations center acts as a clearing house for these coupons. This may involve merely the production of reports for retailers, manufacturers and other interested parties based on the electronically collected data. Specifically, the CPU 16 debits the manufacturer's "account" as indicated at 80, and credits the merchant's "account" as indicated at 82. The customer master file is preferably also updated with all redemption information, as indicated at 84. Periodically, this data can be analyzed and reports generated for each participating manufacturer, as indicated at 86. The reports may include information about the number of coupons distributed and redeemed, buying habits of users, etc. Ultimately, extensive demographic data is included in the reports. Thus, the system eliminates fraud, since there is complete control over every coupon distributed and redeemed and highly detailed demographic information concerning the sale of for each product is available.

H. Detailed Software Description

Figure 6:
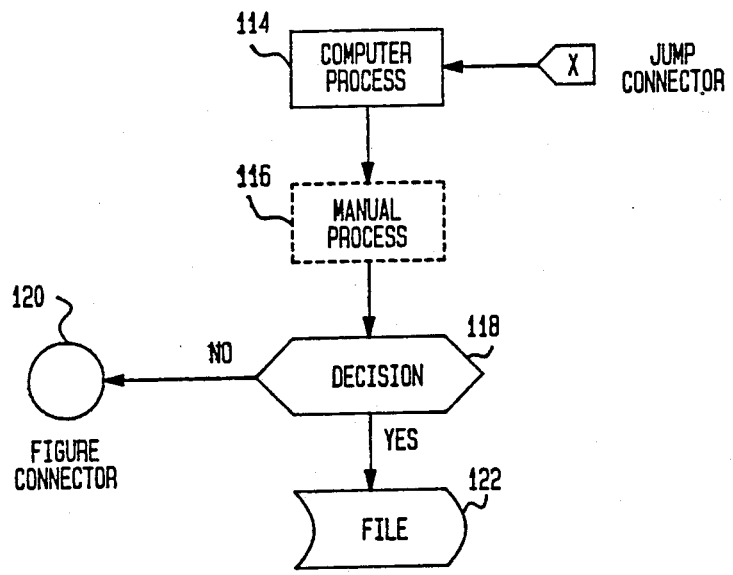
FIG. 6 is a key to the symbols employed in FIGS. 7–40.
Figure 7:
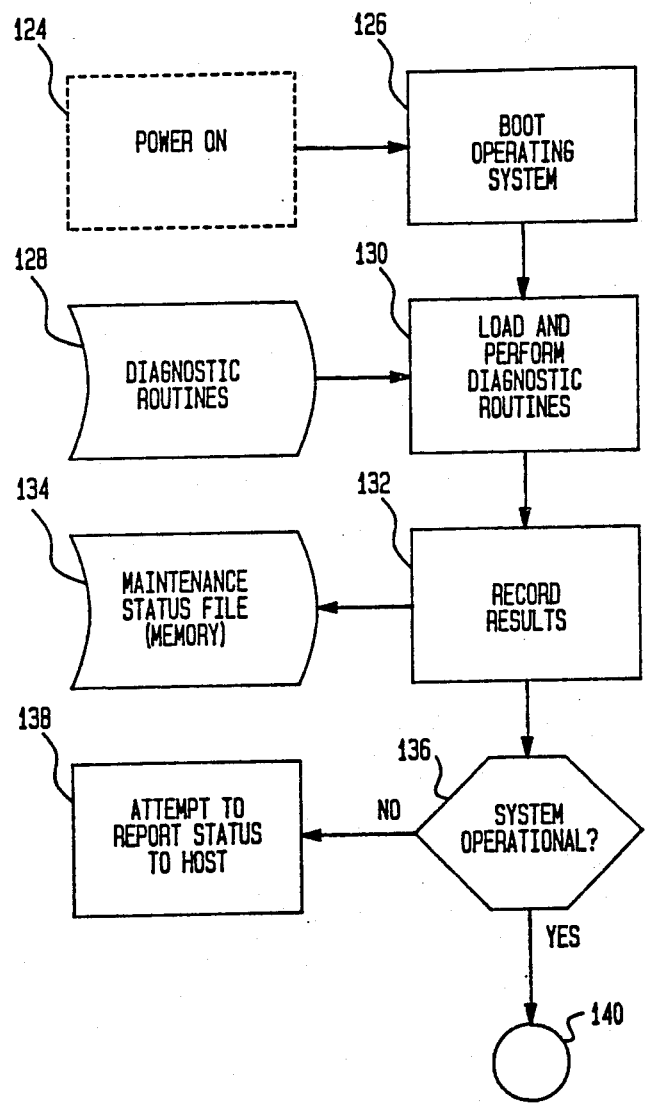
Figure 8:
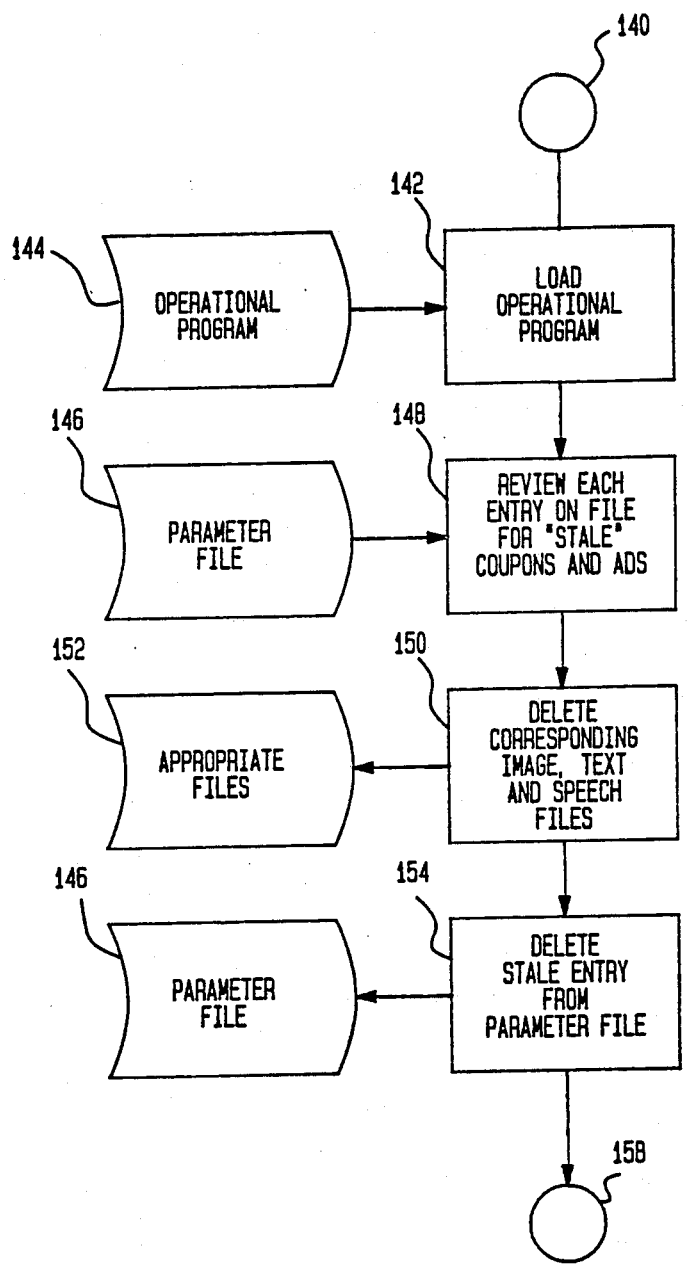

FIG. 6 is a key to the symbols employed in the flowchart constituted by FIGS. 7–40. Computer processes are represented by solid-outline rectangles exemplified at 114. Manual processes are indicated by broken-outline rectangles exemplified at 116. Decisions with yes-no branches are indicated by hexagons 118. Connectors that simply show the connection between adjacent figures are indicated by circles exemplified at 120. Jump connectors that indicate program jumps are represented by directional pentagons exemplified at X. A jump connector can be directed in at only one point in a given process flow but may be directed out at a multiplicity of points. Files are indicated by boxes with curved vertical sides as exemplified at 122.

Primary process flows are shown in FIGS. 7–24, and secondary process flows are shown additionally in FIGS. 25–31. These secondary flows are shown again in FIGS. 32–40 describing the optional capture of data relating to items purchased by the customer in addition to those associated with coupon redemption.

The disclosed flowchart relates to the implementation of a preferred embodiment of the invention, which, however, can be implemented in other ways by those skilled in the art. Moreover, many other embodiments of the invention will readily occur to those skilled in the art, each of which other embodiments can be implemented in various ways.

1. Primary Process Flows

To begin operations, power to the local CDR unit 20 is turned on manually as indicated at 124, which boots the operating system as indicated at 126. The CDR unit 20 loads diagnostic routines from file 128 into memory as indicated at 130 and performs the various routines. As indicated at 132, the diagnostic test results are recorded in a maintenance status file 134 in memory. These results include but are not limited to whether any components are inoperable, whether a low-paper sensor is turned on, which program versions are in use, which data files are on the disk, and the current date and time.

The CDR unit 20 then determines, as indicated at 136, whether the system is operational. If it is not, the local CDR unit 20 attempts to report the status to the central processing unit 16, as indicated at 138. If the system is operational, then, as indicated by the connection 140 linking FIGS. 7 and 8, the program advances to the portion thereof represented in FIG. 8, where it loads the operational program, as indicated at 142, from an operational program file 144. The local CDR unit 20 reviews the parameter file 146 for "stale" coupons and ads, as indicated at 148.

As indicated at 150, the CDR unit 20 deletes corresponding image, text and speech files from appropriate files 152. As further indicated at 154, the local CDR unit 20 deletes stale entries from the parameter file 146.

Figure 9:
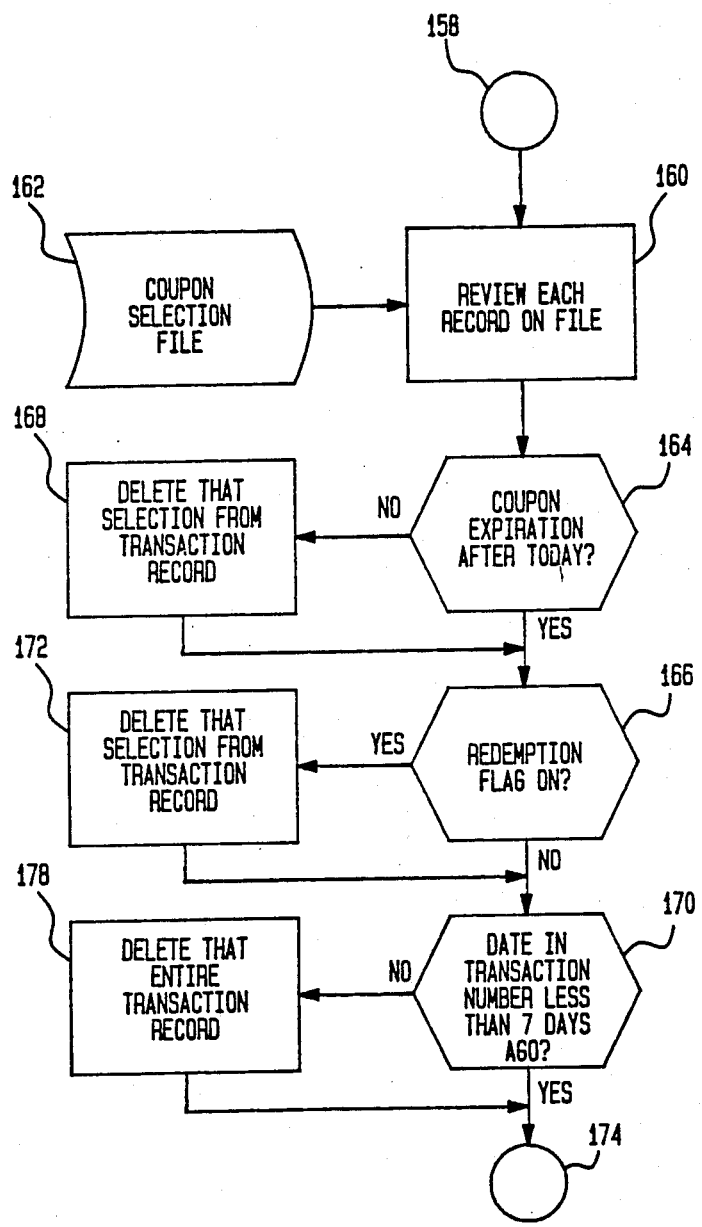
Figure 10:
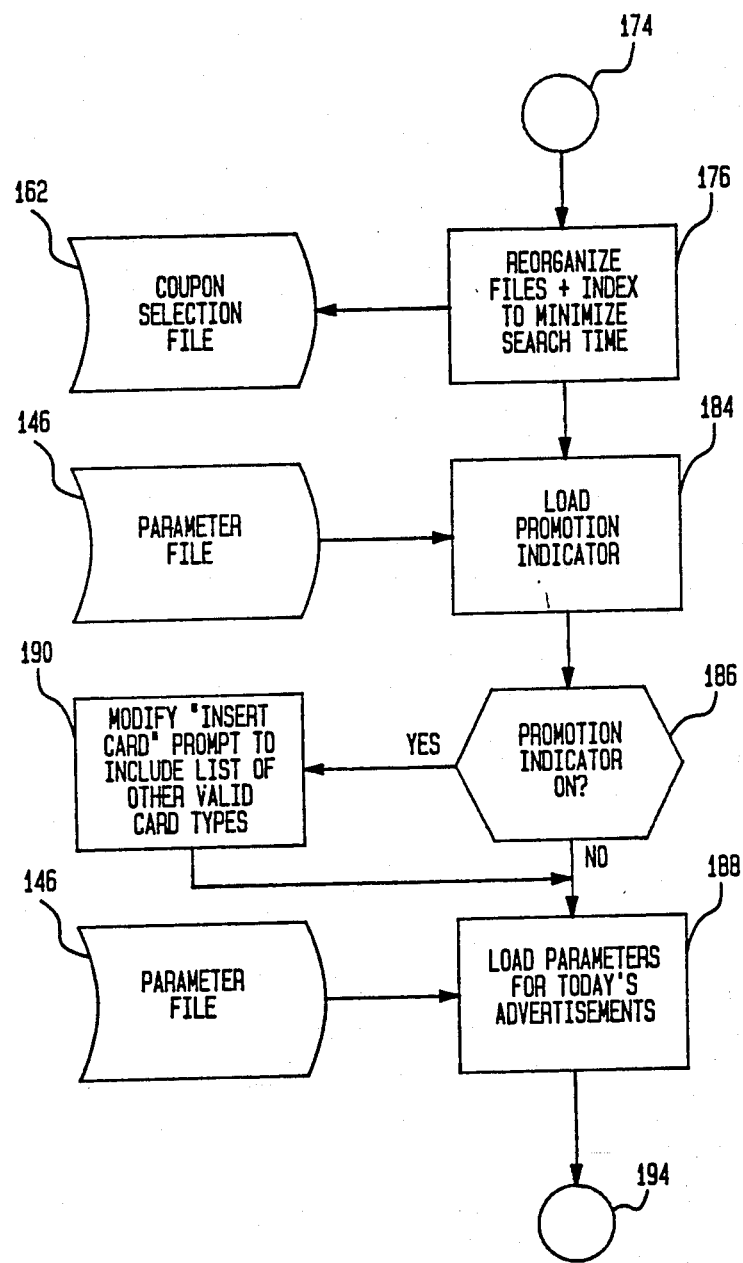

As indicated by connector 158 (FIGS. 8 and 9) the program then advances to the portion thereof represented by FIG. 9, where the CDR unit 20 reviews each record on file, as indicated at 160. These records are found in the coupon selection file 162 and contain transaction numbers, coupon numbers of selections, and, for each selection, the expiration date, redemption flag and other information.

The CDR unit 20 then determines whether the expiration date of each coupon is after today's date, as indicated at 164. If so, a test is performed immediately at 166 as described below. If not, that particular selection is first deleted from the selection transaction record, as indicated at 168, and then the program proceeds to step 166.

At step 166, a test is performed to see whether the redemption flag is on. If not, a test is performed immediately at step 170 as described below. If so, the CDR 20 first deletes that selection from the selection transaction record, as indicated at 172, and the program then proceeds to step 170.

At step 170, a test is performed to see whether the date in the transaction number was within the current coupon time period. If so, then, as indicated by connector 174 in FIGS. 9 and 10, the program proceeds directly to step 176 described below in connection with FIG. 10. If not, the CDR 20 first deletes that entire selection transaction record, as indicated at 178, and then the program proceeds to step 176.

At step 176 (FIG. 10), the CDR 20 reorganizes files and file indexes to minimize search time. The reorganized files are stored in the coupon selection file 162.

The CDR 20 then calls up the parameter file 146 and loads the "promotion" indicator, as indicated at 184. At step 186, it performs a test to determine whether the "promotion" indicator is on. (It will be recalled that, in new installations, where there is preferably a promotional period of about three months during which selected credit card with a magnetic stripe can be used to activate the system.) If the indicator is off, the program proceeds directly to step 188 described below. If the indicator is on, the CDR 20 first modifies the "insert card" prompt that is displayed to the customer to include a list of other valid card types, as indicated at 190, and then the program proceeds to step 188.

At step 188, the CDR 20 loads parameters for current (today's) advertisements. These parameters are taken from the parameter file 146. As indicated by connector 194, FIGS. 10 and 11, the program then advances to the part thereof shown in FIG. 11, where the CDR 20 performs a subroutine for the first ad screen as indicated at 196, and repeats the subroutine for subsequent ad screens as often as the program jumps back from connector E in FIG. 12.

The jump E is generated if step 200 (FIG. 12), which determines whether a card has been inserted, results in a negative answer. In response to such negative answer, or to completion of step 188 (FIG. 10), the CDR 20 loads advertisement graphics, as indicated at 202, from an advertisement image file indicated at 204. This includes advertisement numbers and, for each ad, a digitized image in uncompacted form. The CDR 20 then loads and overlays text, as indicated at 206, this information being taken from the advertisement text overlay file 208. This contains advertisement numbers and, for each ad, the appropriate text overlay.

The CDR 20 then loads speech data, as indicated at 210, this being taken from the advertisement speech data file 212. This information contains advertisement index numbers and, for each ad, the appropriate speech data.

Figure 11:
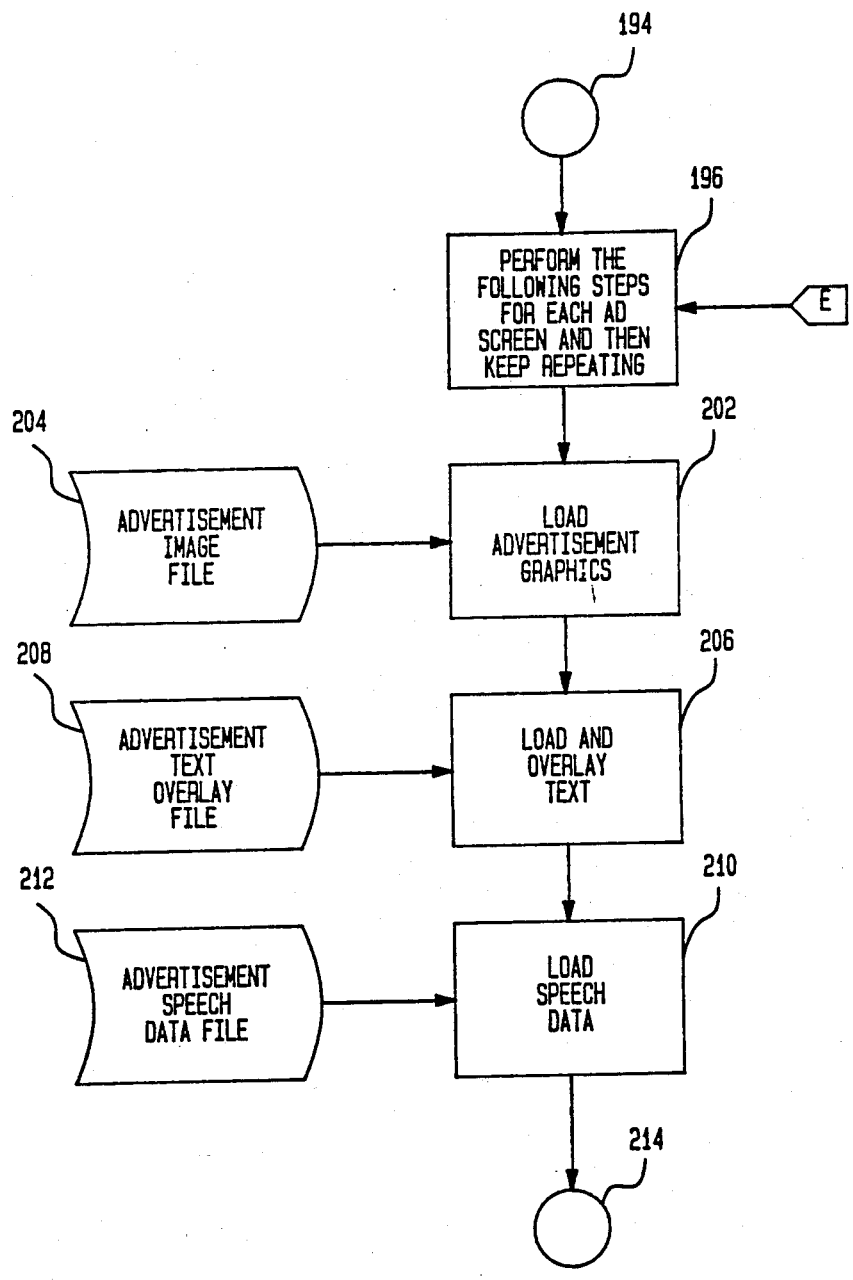
Figure 12:
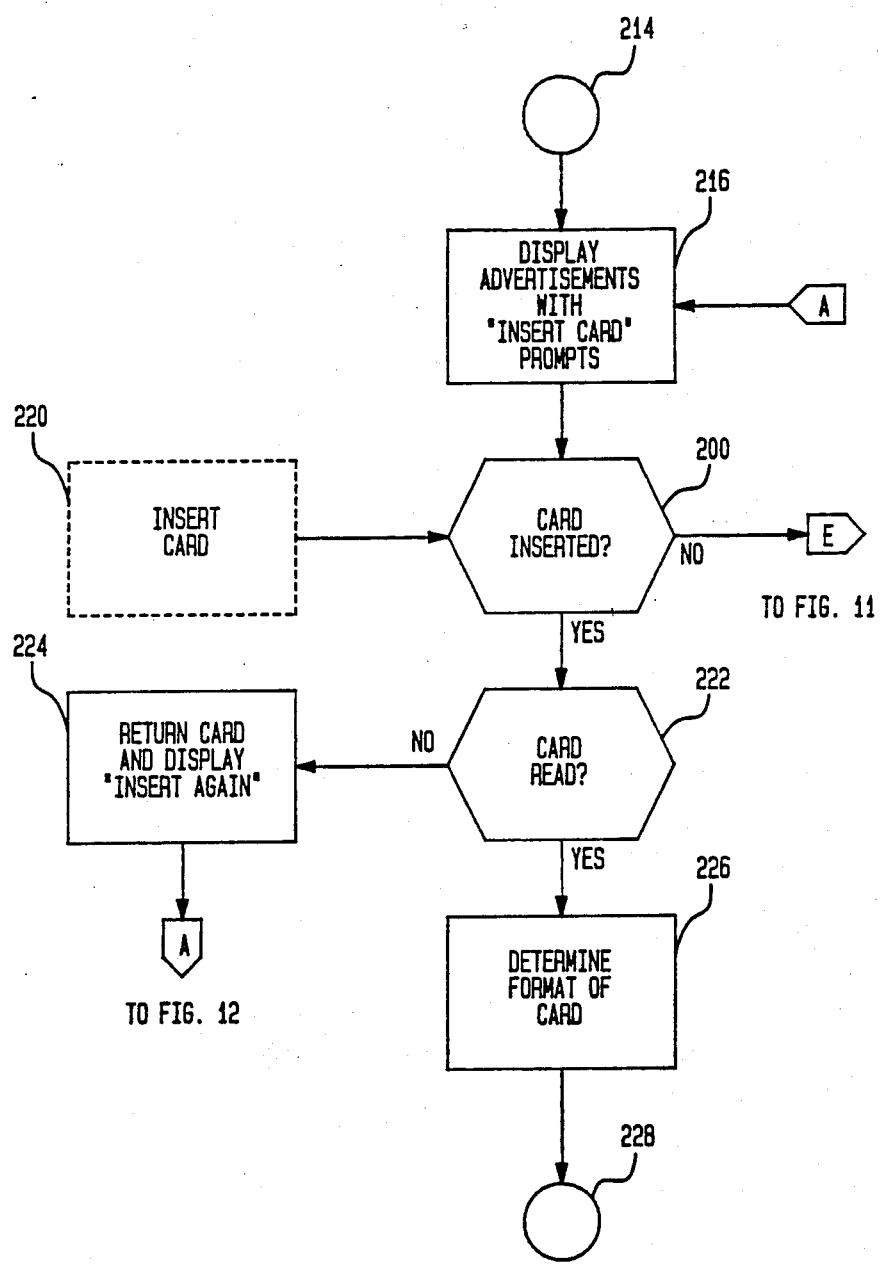

As connector 214 joining FIGS. 11 and 12 indicates, the program then advances to the portion thereof shown in FIG. 12, where the CDR 20 displays advertisements with "insert card" prompts, as indicated at 216.

As indicated by jump connector A, appearing at two locations in FIG. 12, as well as elsewhere, step 216 is also initiated in response to an invalid card insertion, and in other ways discussed below.

Following step 216, the CDR 20 performs a test, as indicated at 200, to determine whether a card has been inserted manually, as indicated at 220. If not, the program jumps back to step 196 (FIG. 11), as indicated by connector E, runs through the subroutine again, and displays the next ad screen. If the test performed at step 200 indicates that a card has been inserted, the CDR 20 performs a test, as indicated at 222, to determine whether the card has been read. If the card has not been read, it returns the card and displays an "insert again" prompt, as indicated at 224. The program then jumps back to step 216, as indicated by connectors A. If the card has been read, the CDR 20 determines the format of the card, as indicated at 226.

Figure 13:
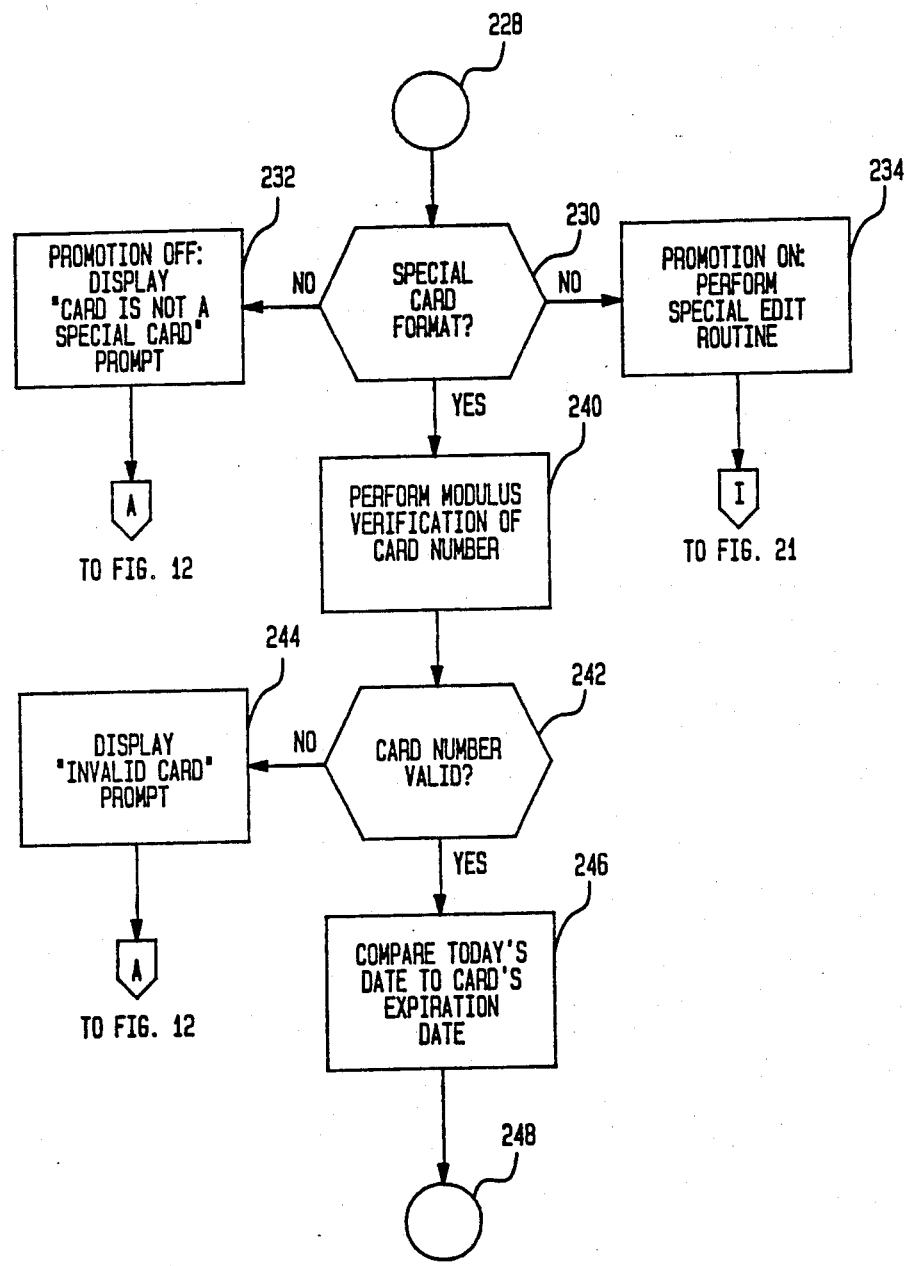

As indicated by connector 228 linking FIGS. 12 and 13, the program then advances to step 230, where the CDR 20 performs a test to determine whether the card is a special card. If this test shows that the card is not a special card, and if the promotion indicator is off, the CDR 20 displays a "card is not a special card" prompt and jumps to step 216 in FIG. 12, as indicated by connectors A in FIGS. 12 an 13. If at step 230 the card is determined not to be a special card and the promotion indicator is on, the CDR 20 performs a special edit routine, as indicated at step 234. Then, as indicated by a connector I in FIGS. 13 and 21, the program jumps to step 238 discussed below in which the CDR 20 compares the issuer's card number to information stored in the coupon selection file 162.

If the test performed at step 230 (FIG. 13) determines that the inserted card is a special card, the CDR 20 performs a modulus verification of the card number, as indicated at 240.

The CDR 20 then performs a test to determine whether the card number is valid, as indicated at 242. If it is not valid, it displays an "invalid card" prompt, as indicated at 244 and, as indicated by connector A (FIGS. 12 and 13) jumps to step 216 in FIG. 12. If the card number is determined to be valid at step 242, the CDR 20 compares today's date to the card's expiration date, as indicated at 246. Then, as indicated by a connector 248 linking FIGS. 13 and 14, the program advances to step 250, where the CDR 20 performs a test to determine whether the card has expired. If so, the CDR 20 displays an "expired card" prompt, as indicated at 252. Then, as indicated by connector A linking FIGS. 14 and 12, the program jumps to step 216.

If the test performed at step 250 determines that the card has not expired, the CDR 20 compares today's date to the card's last period used, as indicated at 252. It then performs a test to determine whether the card has been unused for the current period. If not, the CDR 20 displays a "must wait until next time period" prompt, as indicated at 256, and, as indicated by the connector A linking FIGS. 14 and 12, the program jumps to step 216. If the test performed at step 254 determines that the card has been unused for the current period, the CDR 20 displays coupon selection instructions, as indicated at step 258.

As indicated by a connector B linking FIGS. 14 and 21, step 258 is also initiated in response to a negative answer to a test performed at step 262 discussed below.

Figure 14:
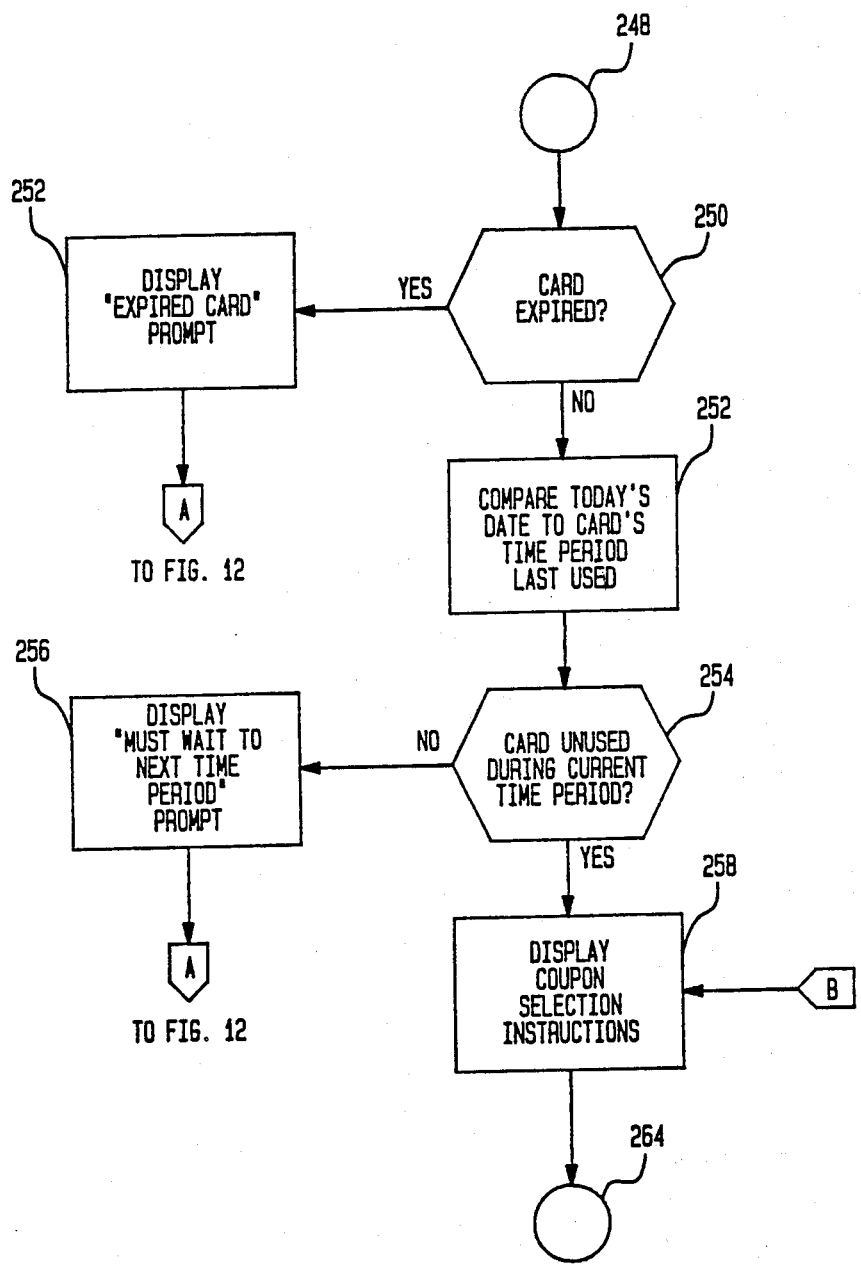
Figure 15:
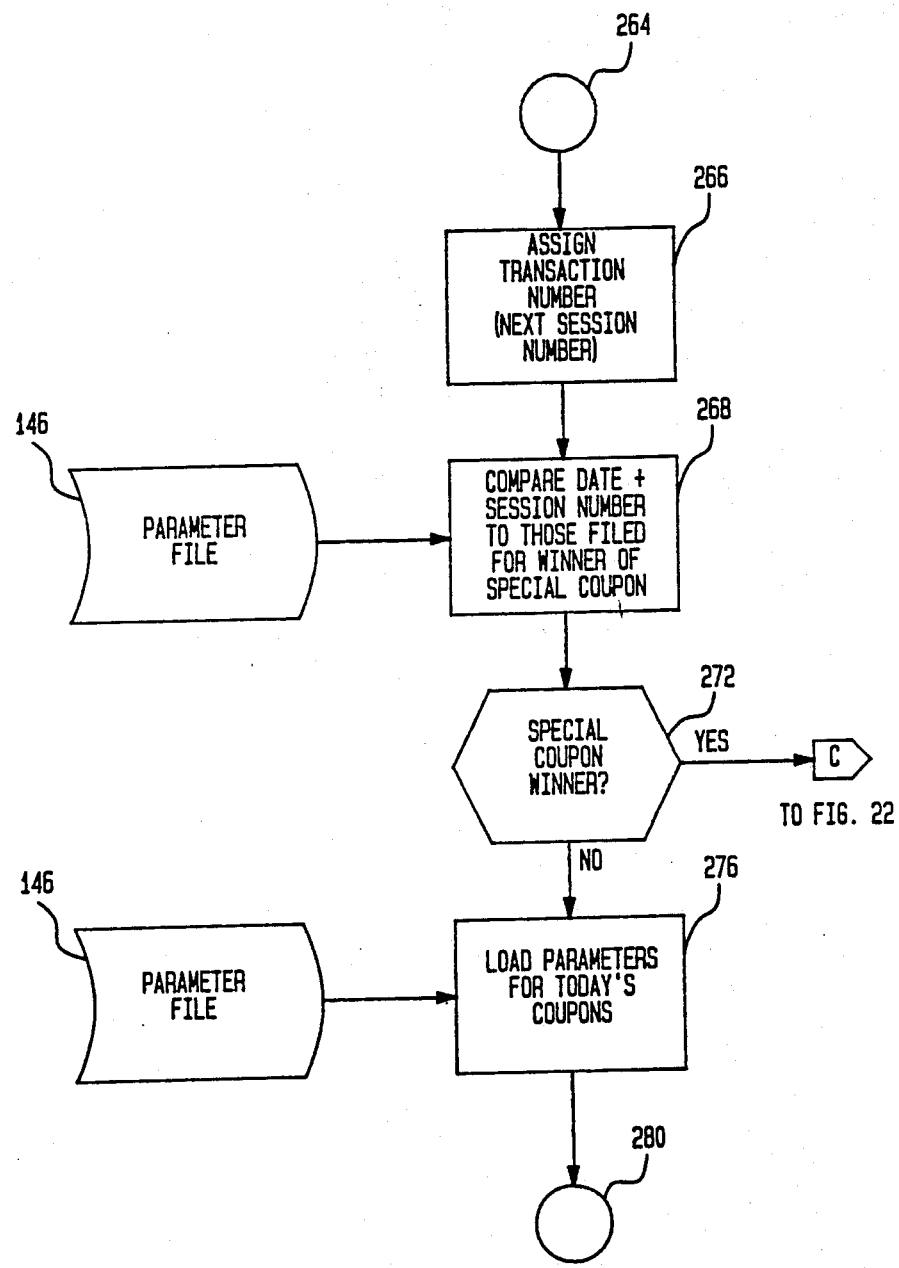

A connector 264 linking FIGS. 14 and 15 indicates that the program then advances to the portion thereof shown in FIG. 15, where the CDR 20 assigns a receipt or transaction number (i.e., a next session number, as indicated at 266). This could include the card number, date, store number, and a sequential number assigned to each customer session.

The CDR 20 next compares the date and session number of the current user to those filed for the winner of the special coupon, as indicated at 268. The information relating to the winner of the special coupon is taken from the parameter file 146 and contains the date and session number of the winner and other relevant information.

Next a test is performed at step 272 to determine whether the inserter of the card is the winner of a special coupon. If so, the program skips to the special coupon process, as indicated by a connector C linking FIGS. 15 and 22.

If the test performed at step 272 determines that the inserter of the card is not a winner of the special coupon, the CDR 20 loads the parameters for today's coupons, as indicated at 276. This information is taken from the parameter file 146.

Figure 16:
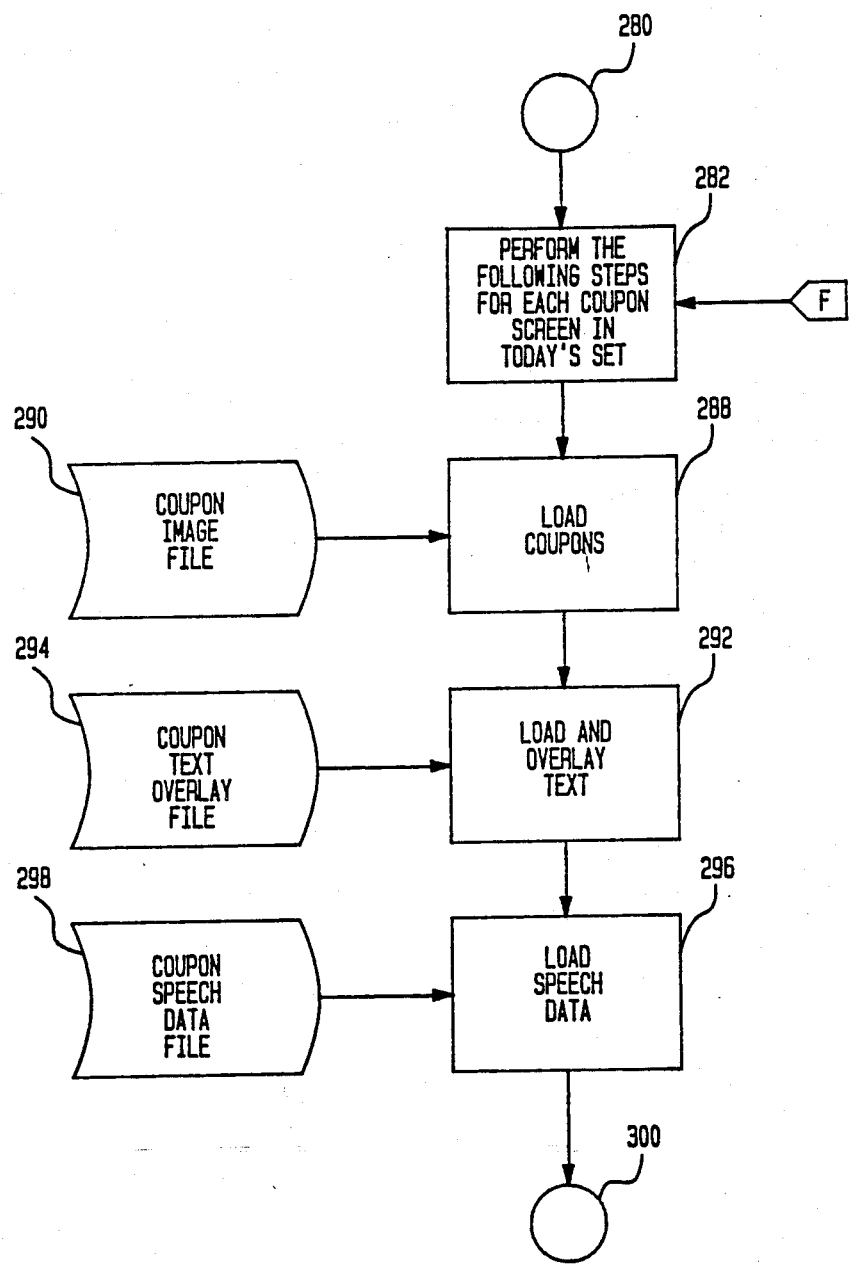

Then, as indicated by a connector 280 linking FIGS. 15 and 16, the program advances to the portion thereof represented in FIG. 16, where the CDR 20 performs a series of steps for each coupon screen in today's set, as indicated at 282. As indicated by a connector F linking FIGS. 16 and 18, the program also jumps to step 282 in response to a negative answer to a test performed at step 286 discussed below.

The steps performed following step 282 include loading coupons, as indicated at 288. This information is taken from a coupon image file 290 and contains coupon index numbers and, for each coupon, a digitized image in uncompacted form.

Next, the CDR 20 loads and overlays text, as indicated at 292. This information is taken from the coupon text overlay file.

Next, the CDR 20 loads speech data, as indicated at 296. This information is taken from the coupon speech data file 298 and contains coupon numbers and, for each coupon, appropriate speech data.

Figure 17:
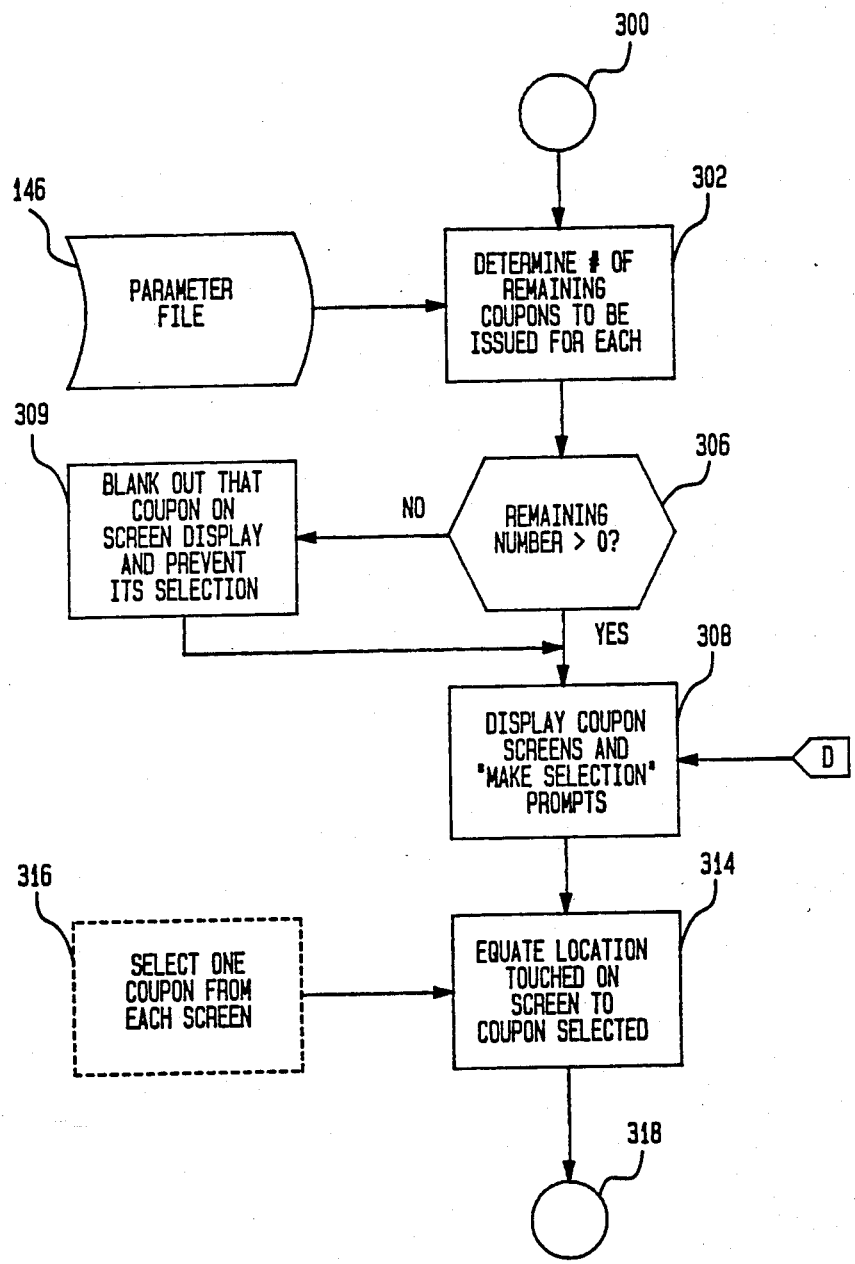

As indicated by a connector 300 linking FIGS. 16 and 17, the program advances to the portion thereof represented by FIG. 17, where the CDR 20 then determines for each coupon the number remaining to be issued, as indicated at 302. This information is taken from the parameter file 146 and includes coupon numbers, the remaining number of coupons to be issued for each, and other information.

At step 306, a test is performed to determine whether the remaining number of coupons exceeds zero. If so, the CDR 20 proceeds directly to step 308 discussed below. If not, the CDR 20 first blanks out that coupon on the screen display to prevent its selection, as indicated at 309, and then proceeds to step 308.

At step 308, the CDR 20 displays coupon screens and "make selection" prompts. Step 308 is also initiated, as indicated by connector D linking FIGS. 17 and 18, in response to step 312 discussed below.

After step 308, the program moves to step 314. The customer manually (by touching an appropriate location on the screen) selects one coupon from each screen, as indicated at 316. At step 314, the CDR 20 equates the location touched on the screen to the coupon selected.

Figure 18:
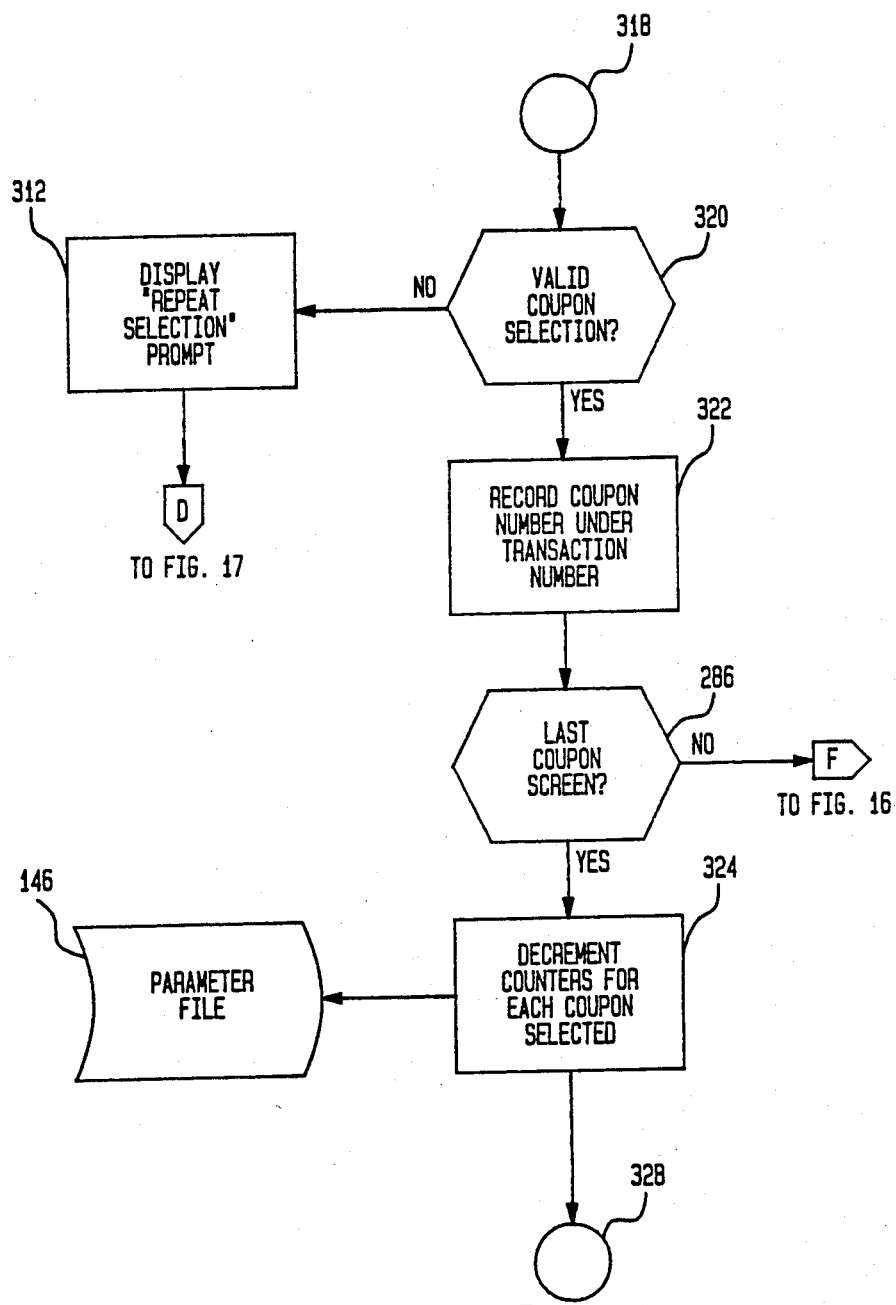

As indicated by a connector 318 linking FIGS. 17 and 18, the program then moves to step 320, at which a determination is made whether the coupon selection is valid. If not, then, as indicated at step 312, the CDR 20 displays a "repeat selection" prompt and jumps, as indicated by connector D, to step 308 in FIG. 17, thereby prompting the customer to try again.

If the step performed at 320 determines that the coupon selection is valid, then the CDR 20 records the coupon number under the receipt number, as indicated at 322.

The program next moves to step 286 briefly mentioned above and performs a test to determine whether this is the last coupon screen. If it is not, then, as connector F indicates, the program jumps to step 282 (FIG. 16) and repeats the process for the following screen. If the test performed at 286 determines that it is the last coupon screen, then the CDR 20 decrements counters for each coupon selected, as indicated at 324, and enters this information in the parameter file 146.

Figure 19:
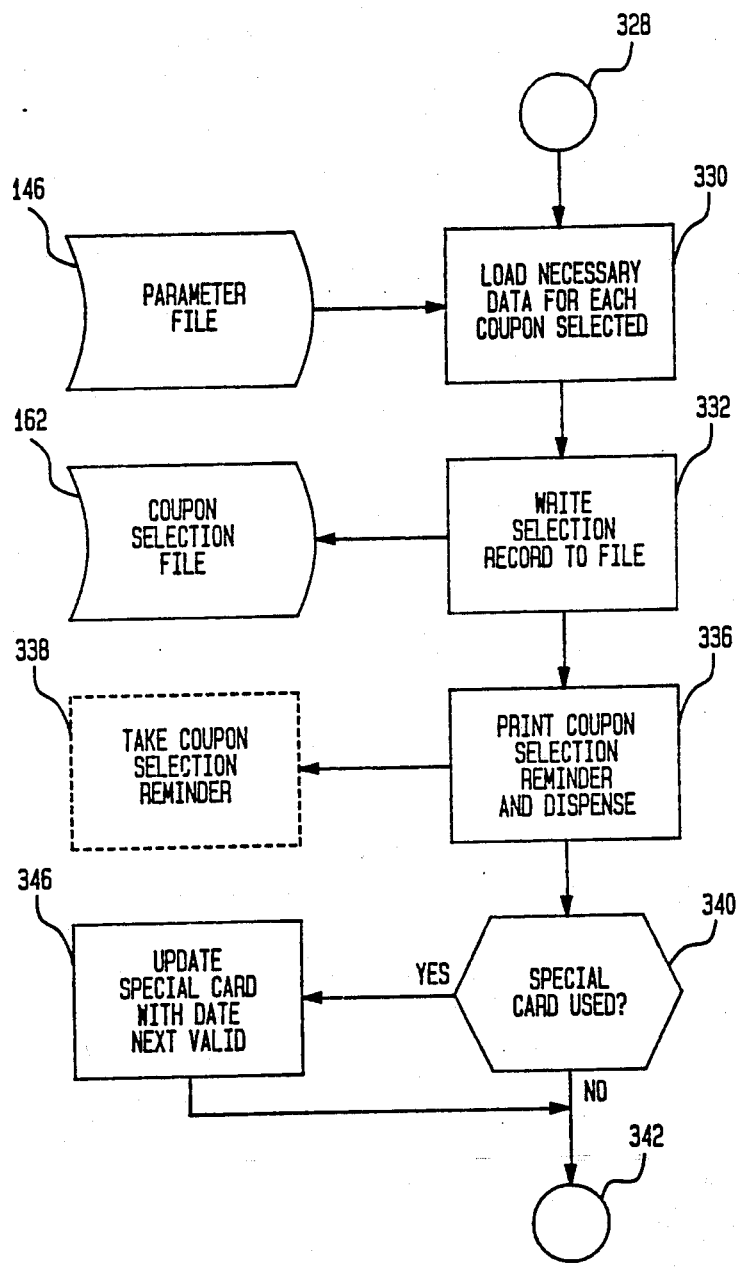
Figure 22:
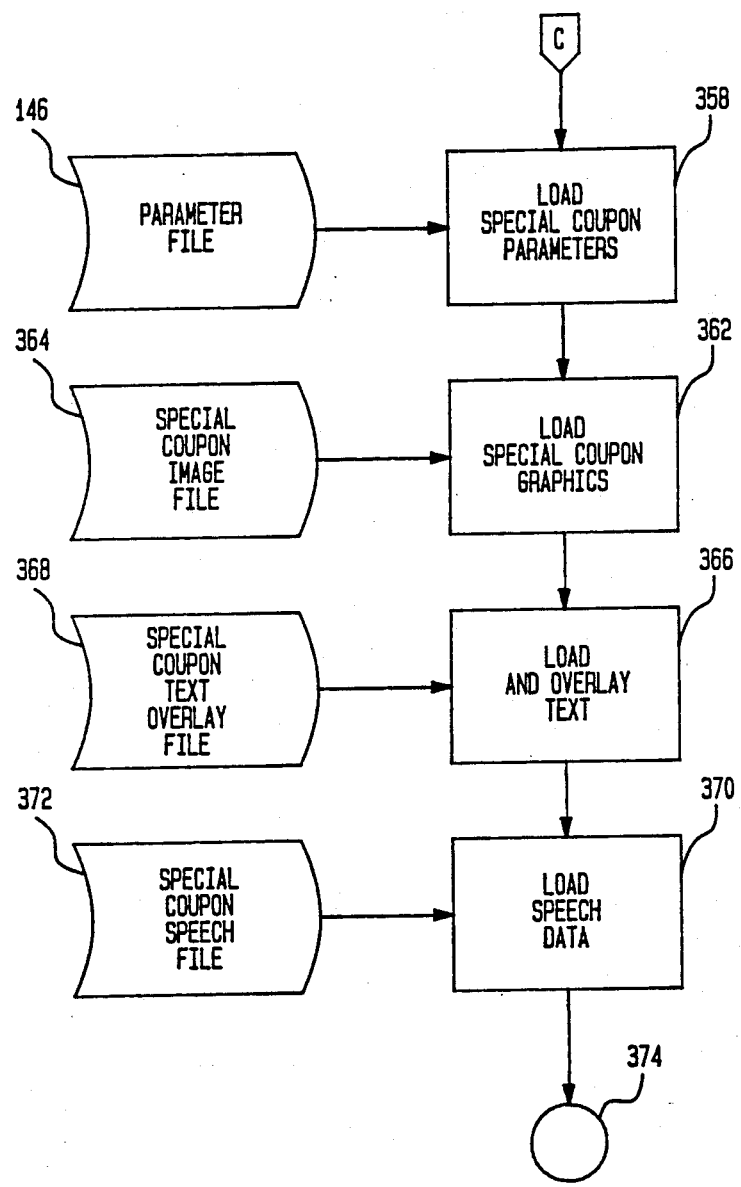
Figure 23:
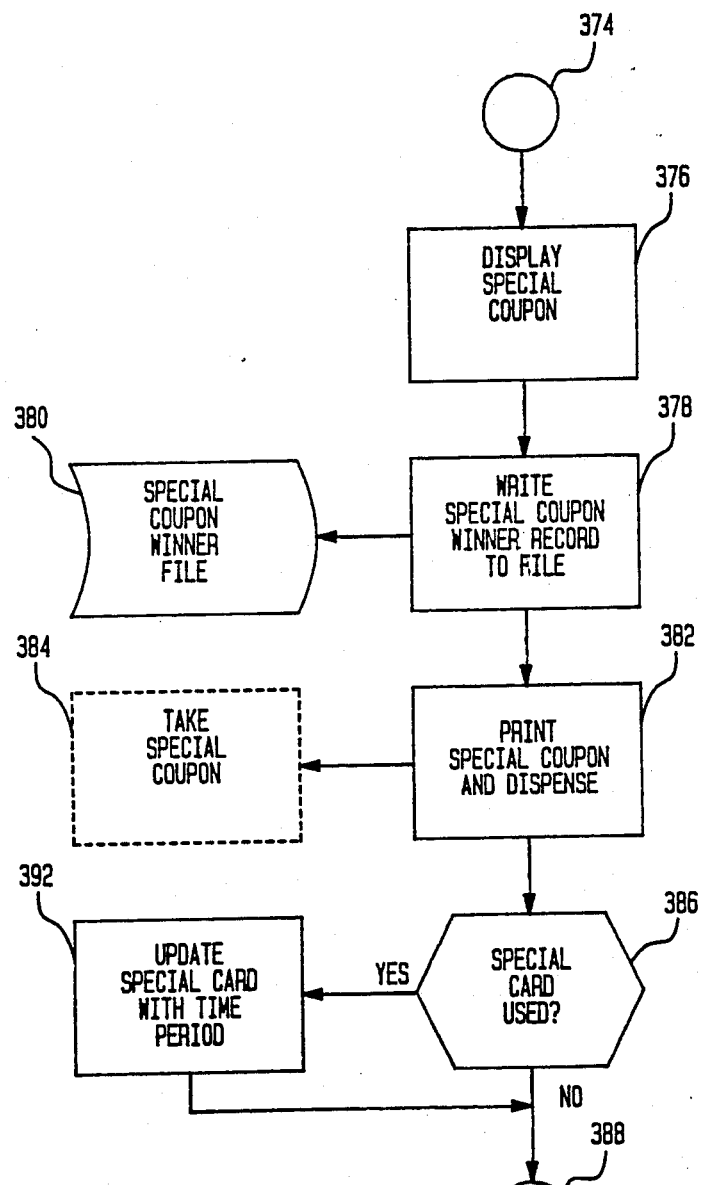
Figure 24:
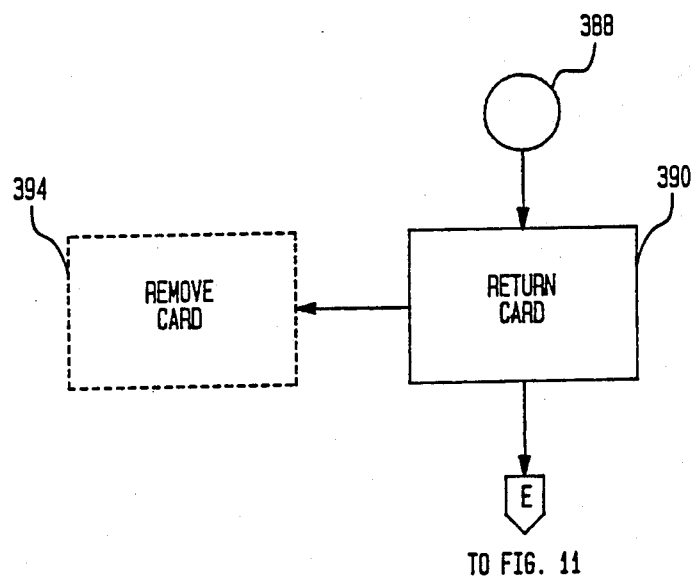

Then, as indicated by connector 328 linking FIGS. 18 and 19, the program advances to the portion thereof shown in FIG. 19, where the CDR 20 loads the necessary data for each coupon selected, as indicated at 330. This information is taken from the parameter file 146 and contains coupon index numbers, product UPC code, product description, discount value of the coupon, expiration date of the coupon, and other pertinent information.

The program next advances to step 332, where the CDR 20 writes the selection record to the coupon selection file 162. This file contains the transaction number and, for each coupon selected, the product UPC code, the discount value of the coupon, and the expiration date of the coupon.

The program next advances to step 336 at which the CDR 20 prints the coupon selection list for the benefit of the customer and dispenses the list to the customer. This printout contains the receipt number and, for each coupon selected, a product description, the coupon discount value, and the coupon expiration date. The customer takes the coupon selection reminder with him while he shops, as indicated at 338.

The program next advances to step 340 at which a test is performed to determine whether a special card is being used. If not, then, as indicated by a connector 342 linking FIGS. 19 and 20, the program advances to step 344 discussed below. If the test performed at step 340 shows that a special card was used, the CDR 20 first updates the special card with the code indicating the current time period, as indicated at 346, and the program then advances to step 344 (FIG. 20). At step 344, the card is returned to the shopper, who removes the card, as indicated at 348.

After the return of the card as indicated at step 344, the program loops back and optionally displays at least one advertising screen, as indicated at 350 and by jump E linking FIGS. 20 and 11.

It will be recalled that in FIG. 13 at step 230, a test was performed to determine whether the card inserted by the customer was a special card and that, if it was not, and if the promotion indicator was on, a special edit routine was performed, indicated at 234. The jump I thereupon initiated goes to FIG. 21. At step 238 in FIG. 21 the CDR 20 compares the issuer's card number to information contained in the coupon selection file 162. At step 262, as briefly mentioned above, a test is performed to determine whether a previous use of the card is already on file. In case the answer is in the negative, the program jumps as indicated by connector B linking FIGS. 21 and 14, as discussed above, and coupon selection instructions are displayed. In case the answer to the test performed at step 262 is in the affirmative, the CDR 20 displays a "card used previously" prompt, as indicated at 356, and, as indicated by connector A, loops back to step 216 (FIG. 12) discussed previously.

It will further be recalled in connection with FIG. 15, step 272, that a test was performed to determine whether the customer who has inserted the card is a winner of the special coupon. If the answer is in the affirmative, then, as indicated by connector C, linking FIGS. 15 and 22, the routine beginning at step 358 is initiated by loading the special coupon parameters. This information is taken from parameter file 146 and includes description of the prize won and the expiration date.

The CDR 20 next loads the special coupon graphics, as indicated at 362. This information is taken from a special coupon image file 364.

The CDR 20 next loads and overlays text, as indicated at 366. This information is taken from a special coupon text overlay file 368.

The CDR 20 next loads speech data, as indicated at 370, from a special coupon speech file 372. Then, as indicated by a connector 374 linking FIGS. 22 and 23, the program advances to the portion thereof shown in FIG. 23, where the CDR 20 displays the special coupon, as indicated at 376.

Then, as indicated at step 378, the CDR 20 writes the special coupon winner record into a special coupon winner file 380.

The CDR 20 next prints the special coupon and dispenses it, as indicated at 382, and the customer takes the special coupon, as indicated at 384.

At step 386, a test is performed to determine whether a special card was used by the customer. If not, then, as indicated by a connector 388 linking FIGS. 23 and 24, the program advances to the portion thereof shown in FIG. 24, and the card is immediately returned, as indicated at 390. If the test performed at step 386 determines that a special card was used, the special card is first updated with the current time period (and optionally other information), as indicated at 392, and then returned as indicated at 390. The customer then removes the card, as indicated at 394. Then, as indicated by connector E linking FIGS. 24 and 11, the program loops back to step 196 discussed above.

2. Secondary Process Flows (Without Optional Purchase Data Capture

FIGS. 25-31 show secondary process flows without the option to perform purchase data capture activated.

Figure 25:
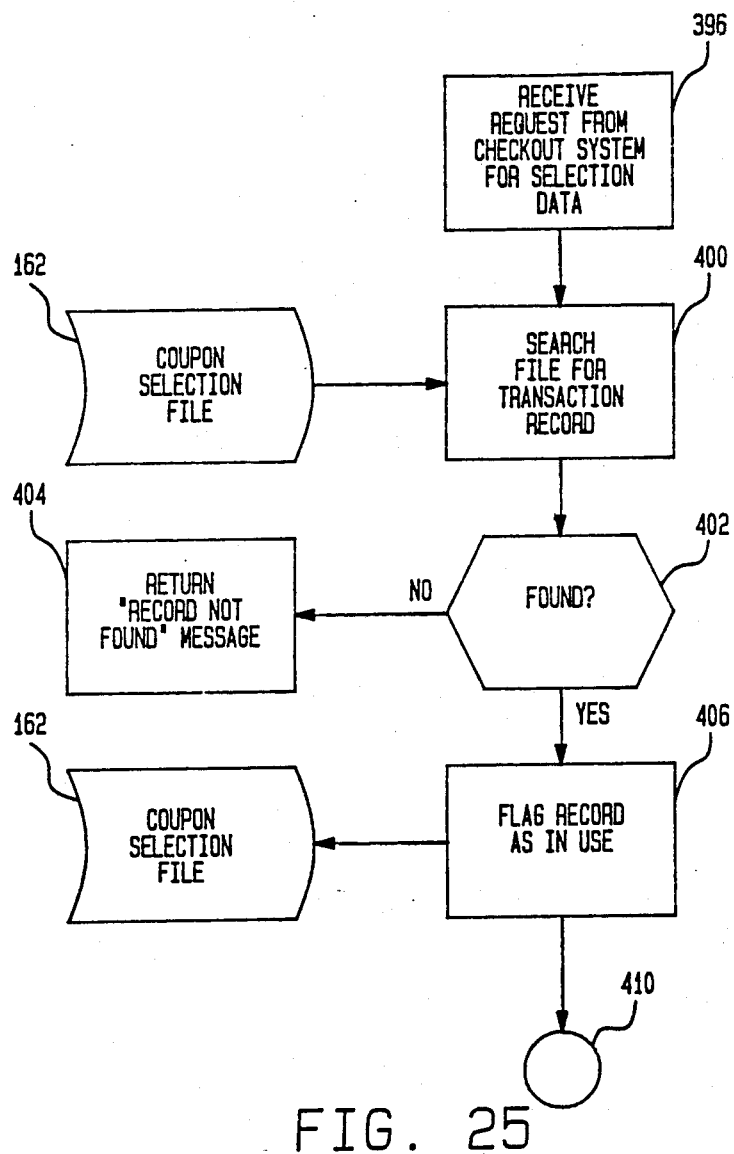

Periodically, the CDR unit 20 receives a request from the checkout system 18 (FIG. 1) for selection data, as indicated at 396 (FIG. 25). This request contains the card number of the customer (as read by the checkout scanner) so that the CDR 20 can identify the customer. The CDR 20 then searches the coupon selection file 162 for the transaction record, as indicated at 400. At step 402, a determination is made whether the transaction record is found. If not, it returns a "record not found" message to the automated checkout system 18, as indicated at 404. If the determination made at step 402 is that the record is found, the program flags the record as in use, as indicated at 406. This information is recorded in the coupon selection file 162.

Figure 26:
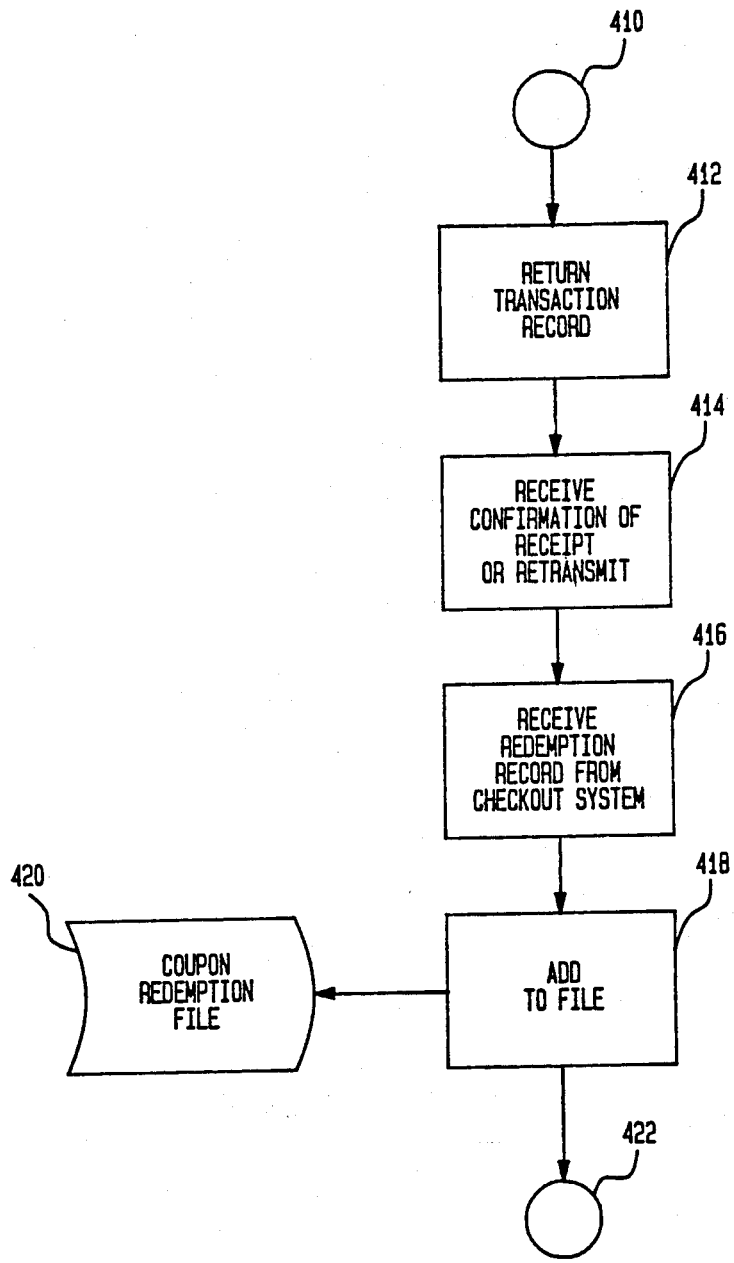
Figure 27:
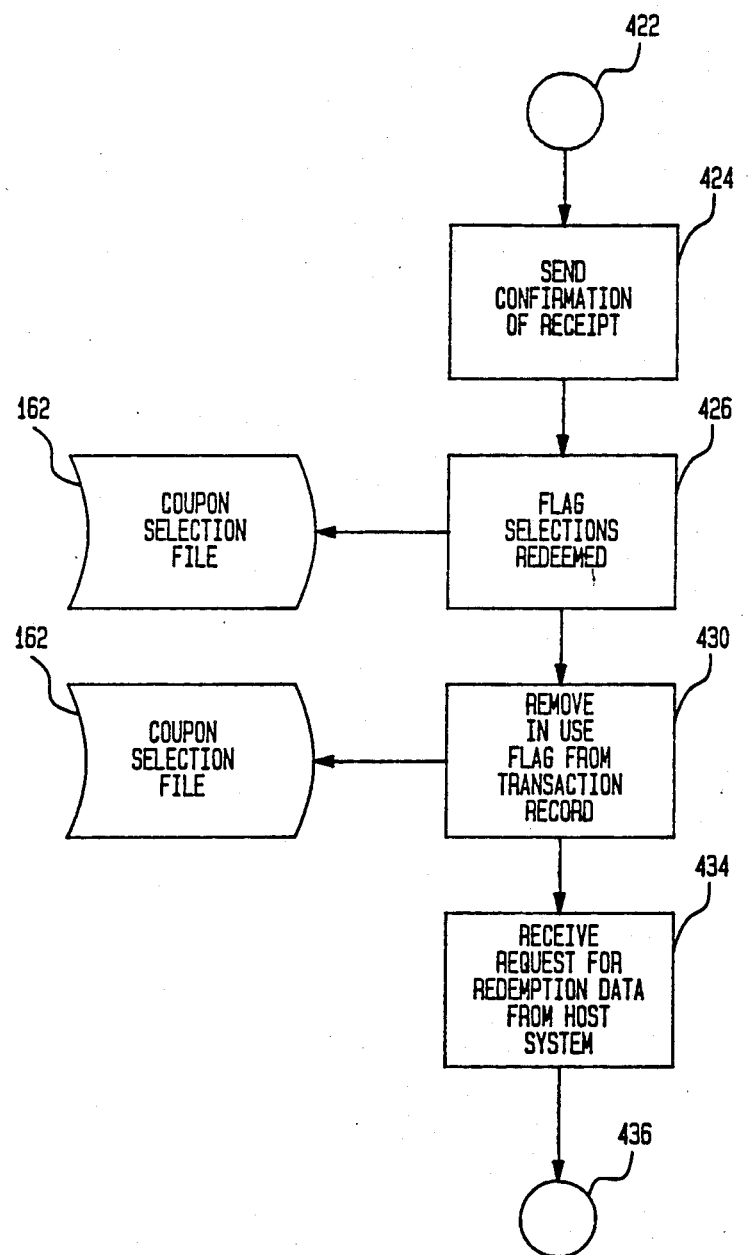

Then, as indicated by a connector 410 linking FIGS. 25 and 26, the program advances to the portion thereof shown in FIG. 26, and the CDR 20 sends the selection transaction record to the checkout system 18, as indicated at 412.

Next, the CDR 20 receives a confirmation of receipt from the checkout system 18 or retransmits the message returning the selection transaction record, as indicated at 414.

Alternatively, coupon selection data may be sent to the checkout system as the CDR unit 20 completes each selection session.

The CDR 20 then receives the redemption record from the checkout system 18, as indicated at 416. As indicated at 418, this is added to the coupon redemption file 420. Then, as indicated by a connector 422 linking FIGS. 26 and 27, the program advances to the portion thereof shown in FIG. 27 and the CDR 20 sends confirmation of receipt of the message back to the checkout system 18, as indicated at 424.

As indicated at 426, the CDR 20 flags selections redeemed in the coupon selection file 162. Then, as indicated at 430, the CDR 20 removes the "in use" flag from the transaction record and writes this information in the coupon selection file 162.

Next, the CDR 20 receives a request for redemption data from the CPU 16, as indicated at 434. As indicated by a connector 436 linking FIGS. 27 and 28, the program then advances to the portion thereof shown in FIG. 28, and the CDR 20 responds with maintenance status at step 438. This information is derived from the maintenance status file 134.

The CDR 20 either receives confirmation of receipt of the transmission or retransmits the message, as indicated at 442.

The CDR 20 then marks the end of the file, as indicated at 444. This mark is entered in the coupon redemption file 420.

The CDR 20 then calls up the coupon redemption file 420 up to the above mentioned marker and transmits the data to the CPU 16, with controls, as indicated at 448.

Figure 28:
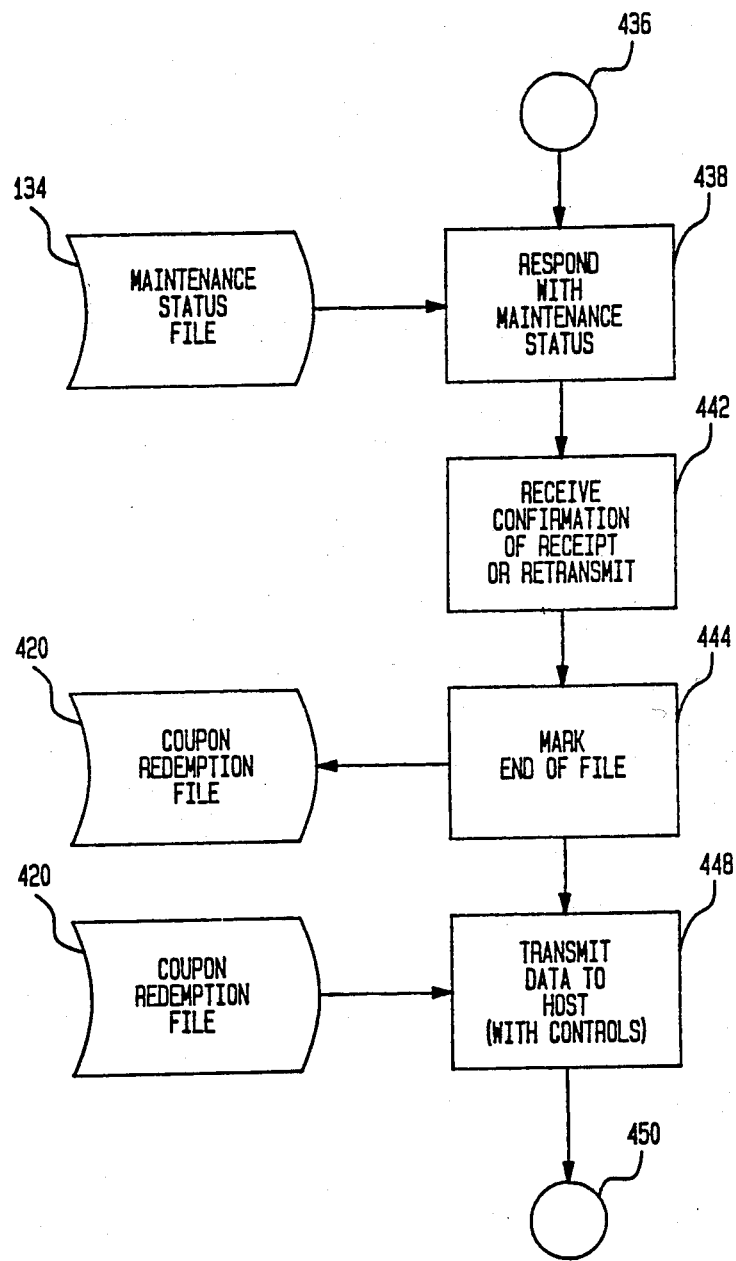
Figure 29:
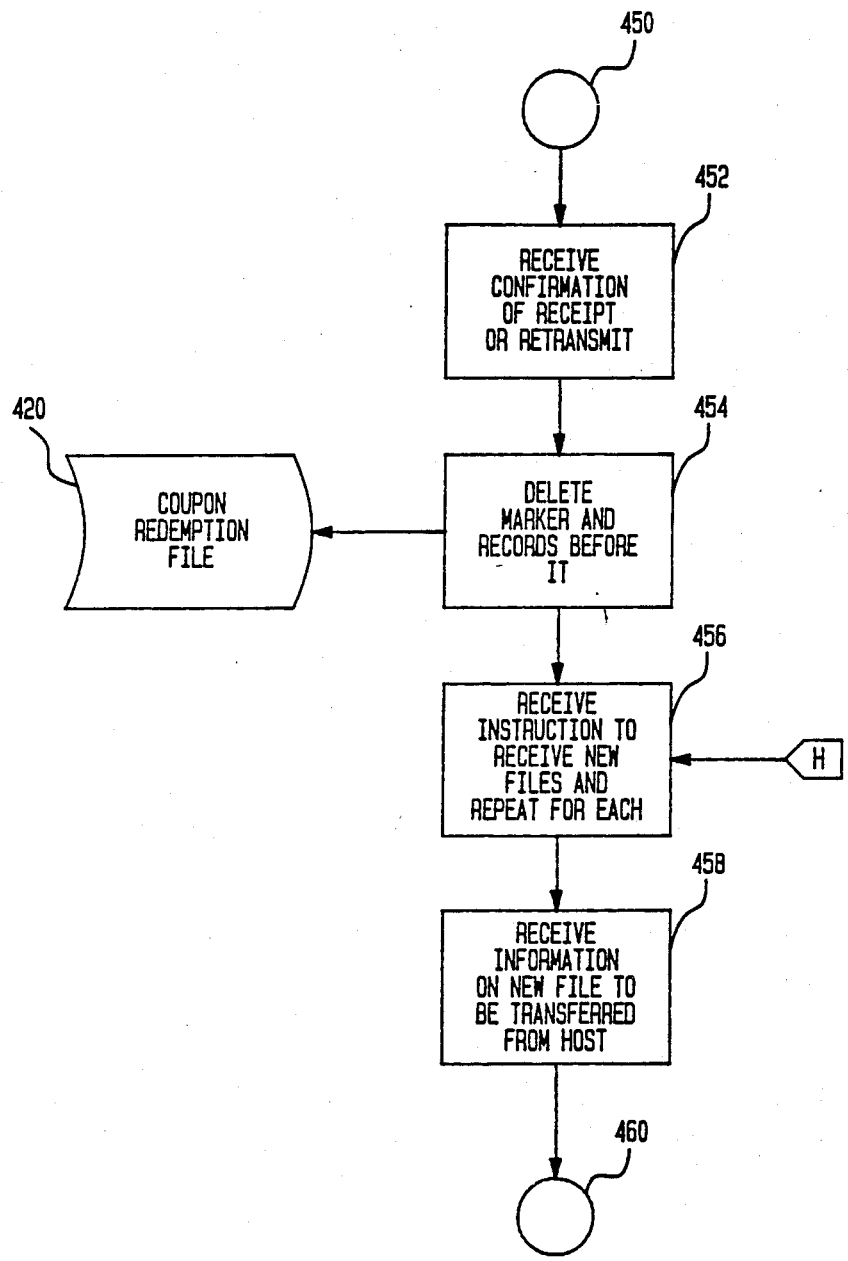

Connector 450 links FIGS. 28 and 29. The CDR 20 either receives confirmation of receipt from the CPU 16 or retransmits the message, as indicated at 452 in FIG. 29.

As indicated at 454, the CDR 20 deletes the marker which was entered at step 444 and the records preceding it either immediately or, optionally, at a later time. This information is recorded in the coupon redemption file 420. As indicated at 456, the CDR 20 then receives an instruction to receive new files. For each such file, the program runs through the subroutine beginning at step 456 and ending at jump H in FIG. 31. As indicated at 458, the CDR 20 first receives information on a new file to be transferred from the CPU 16. This information includes transmission controls, file type and identification, segment number (if multiple parts) and dates for usage.

Figure 30:
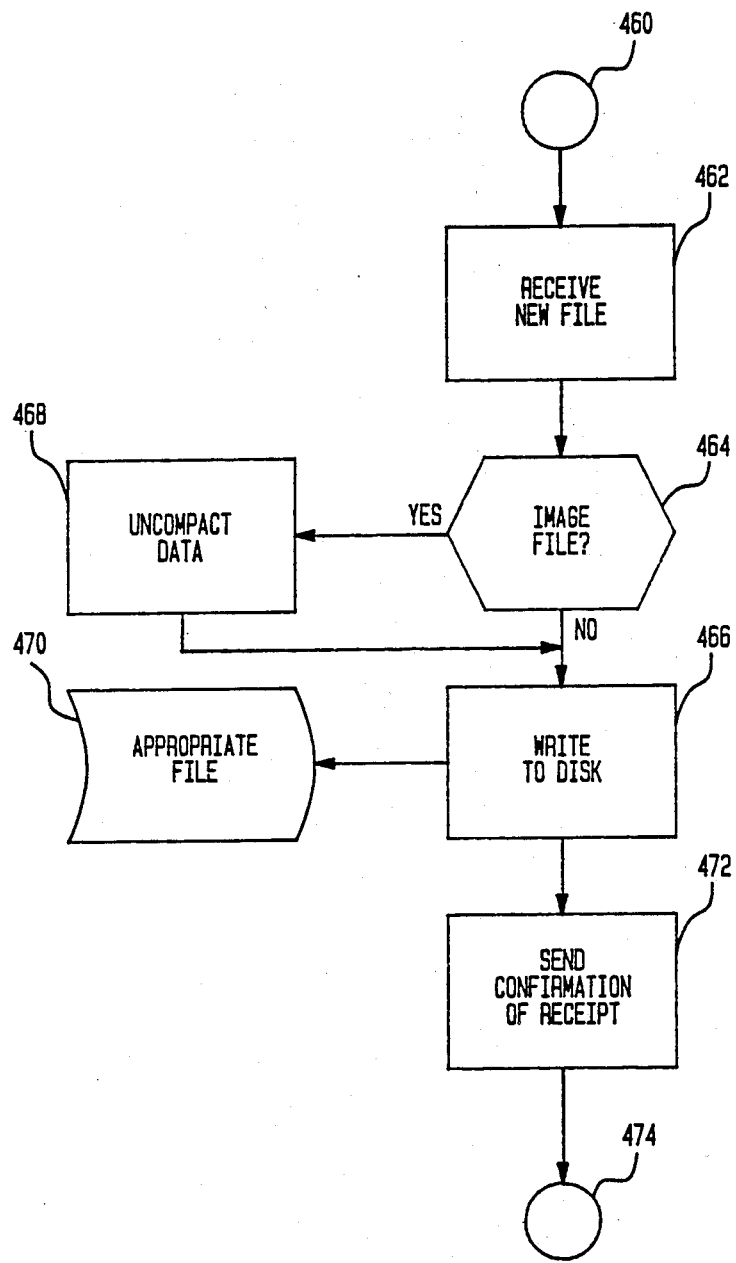

Connector 460 links FIGS. 29 and 30. As indicated at 462, the CDR 20 then receives a new file. This may include image files, text overlay files, speech data files, parameter files and programs. At step 464, a determination is made whether an image file is included. If not, the new file received at step 462 is immediately written into the disk, as indicated at 466. If the determination made at step 464 reveals that an image file is included, the data is first uncompacted, as indicated at 468, and then written into the disk as indicated at 466. This information is entered in an appropriate file 470.

Alternatively, image data transmitted before it is to be used may be stored on the disk in compacted form and uncompacted when it is to become active. This would save disk space.

The CDR 20 next sends confirmation of receipt, as indicated at 472.

Figure 31:
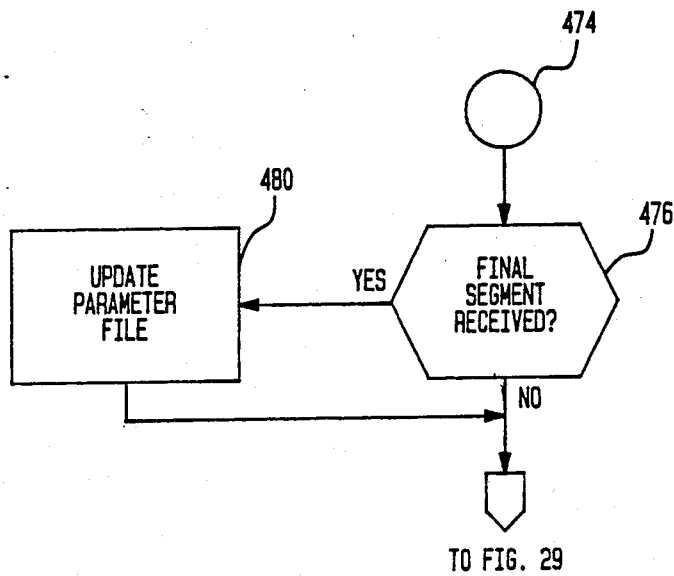

Connector 474 links FIGS. 30 and 31. At step 476 (FIG. 31) a determination is made whether the final segment has been received. If not, then, as indicated by connector H linking FIGS. 31 and 29, the CDR 20 loops back for the next file. If the determination made at step 476 reveals that the final segment has been received, the CDR 20 first updates the parameter file with data such as coupon index number, dates for use, etc. as indicated at 480, and then loops back for the next file.

3. Secondary Process Flows With Optional Purchase Data Capture)

FIGS. 32-40 show secondary process flows with the option to perform purchase data capture activated.

Periodically, the CDR 20 receives a request from the checkout system 18 for data regarding the selections made by a particular customer, as indicated at 482. This request contains the customer's card number. The CDR 20 searches the coupon selection file 162 for the selection record, as indicated at 484.

At step 486, the CDR 20 makes a determination whether the selection record has been found. If not, it returns a "record not found" message to the automated checkout system 18, as indicated at 488.

If the determination made at step 486 reveals that the customer selection record has been found, the CDR 20 flags the record as in use, as indicated at 490, and records this in the coupon selection file 162.

Figure 32:
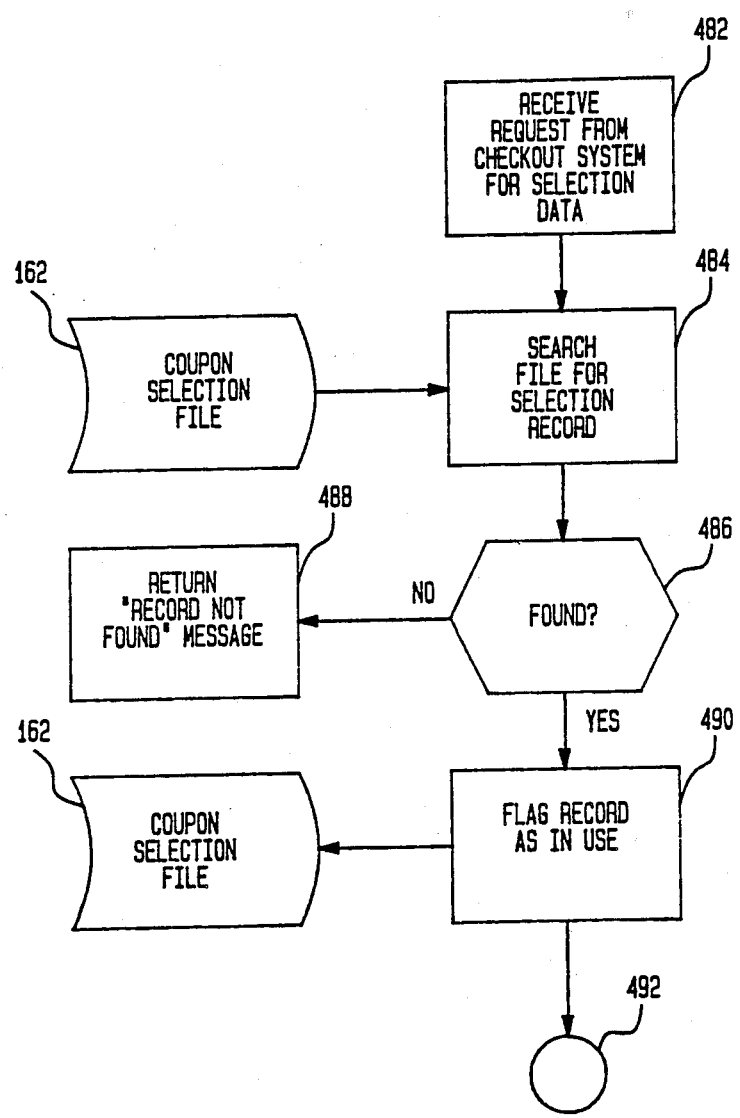
Figure 33:
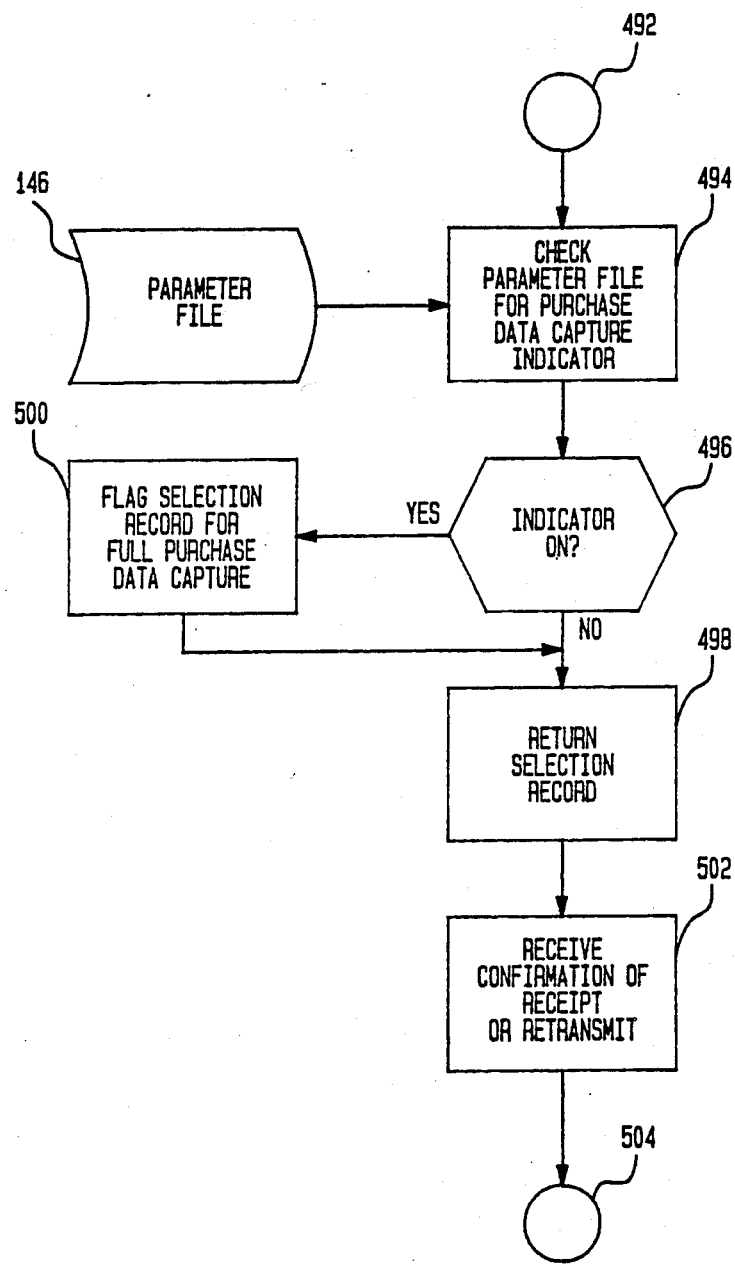

Connector 492 links FIGS. 32 and 33. At step 494, the CDR 20 checks the parameter file 146 for a purchase data capture indicator. At step 496, the CDR 20 makes a determination whether the indicator is on. If it is not on, the CDR 20 returns the selection record to the automated checkout system 18, as indicated at 498.

If the determination made at step 496 reveals that the indicator is on, the CDR 20 first flags the selection record for full purchase data capture, as indicated at 500, and then returns the selection record as indicated at 498.

The CDR 20 then either receives confirmation of receipt of the transmission from the automated checkout system 18 or retransmits the message, as indicated at 502. (Alternatively, the CDR unit 20 sends the coupon selection data to the checkout system at the end of each selection session).

Figure 34:
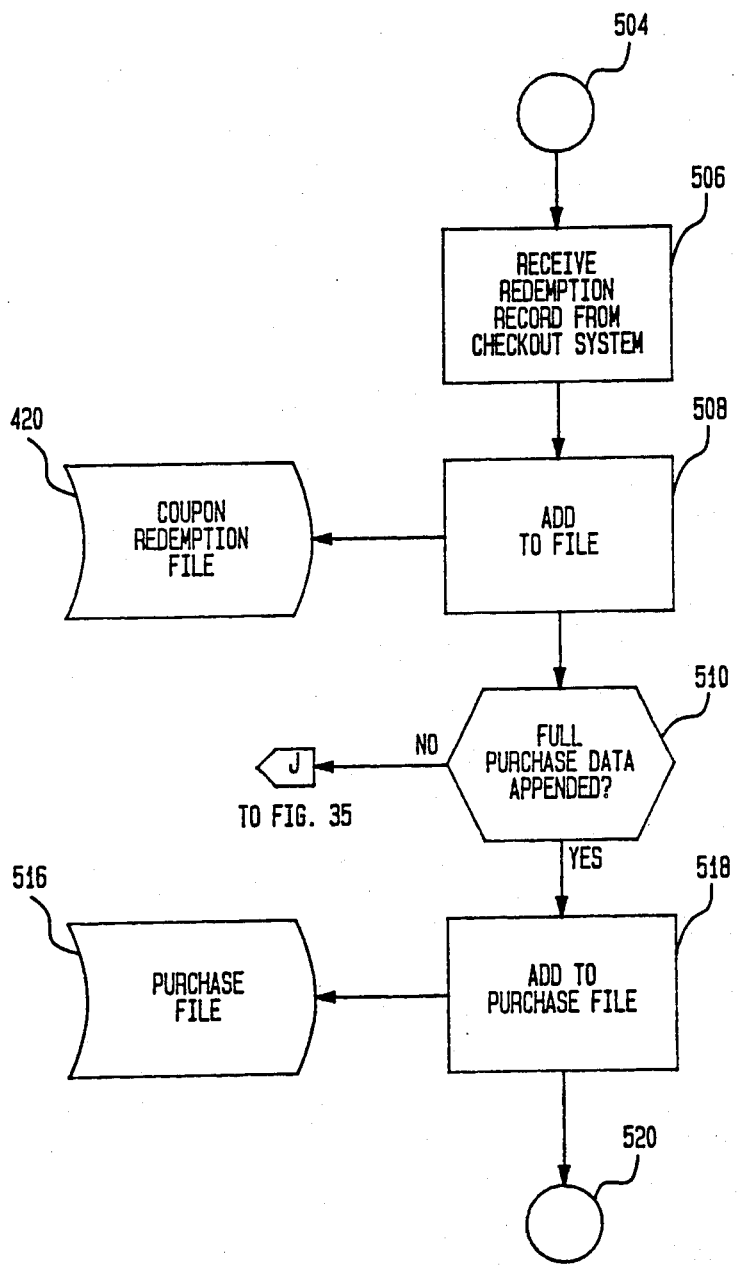

Connector 504 links FIGS. 33 and 34. At step 506 the CDR 20 receives the redemption record from the checkout system 18. At step 508 the CDR 20 records this information in the coupon redemption file 420. This information contains the selection transaction number and for each transaction the selections redeemed.

At step 510 the CDR 20 makes a determination whether full purchase data has been appended. If the determination at step 510 reveals that the full purchase data has not been appended, the program jumps to step 512 (FIG. 35) discussed below, as indicated by connector J. If the determination made at step 510 reveals that full purchase data has been appended, the CDR adds this information to the purchase file 516 as indicated at 518. This information includes the transaction number and, for each purchase, the UPC product code and price.

Figure 35:
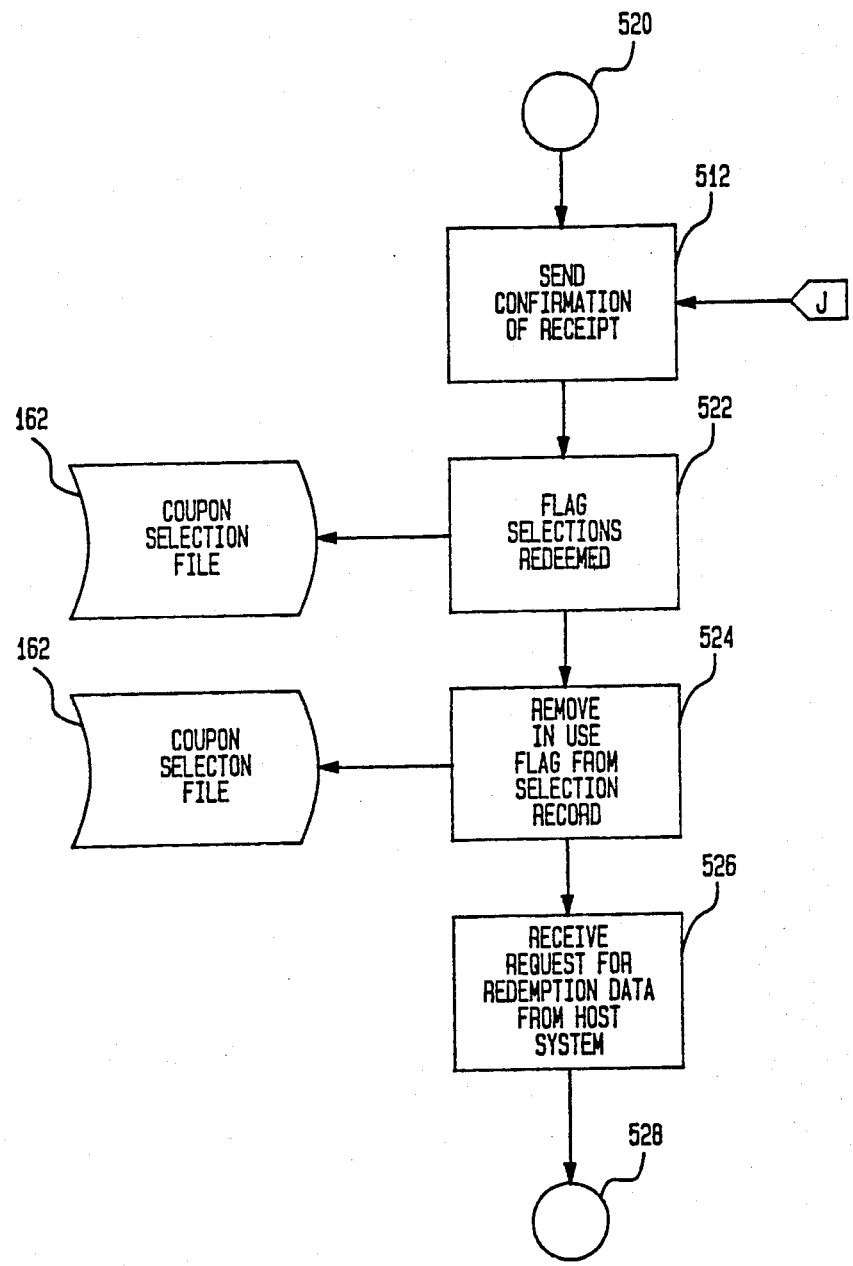

Connector 520 links FIGS. 34 and 35. At step 512, the CDR 20 sends confirmation of receipt. This part of the program is reached via either of the connectors J and 520. At step 522, the CDR 20 flags the selections redeemed and enters the information in the coupon selection file 162. At step 524, the "in use" flag is removed from the selection record, and this information is recorded in the coupon selection file 162. At step 526, the CDR 20 receives a request for redemption data from the CPU 16.

Figure 36:
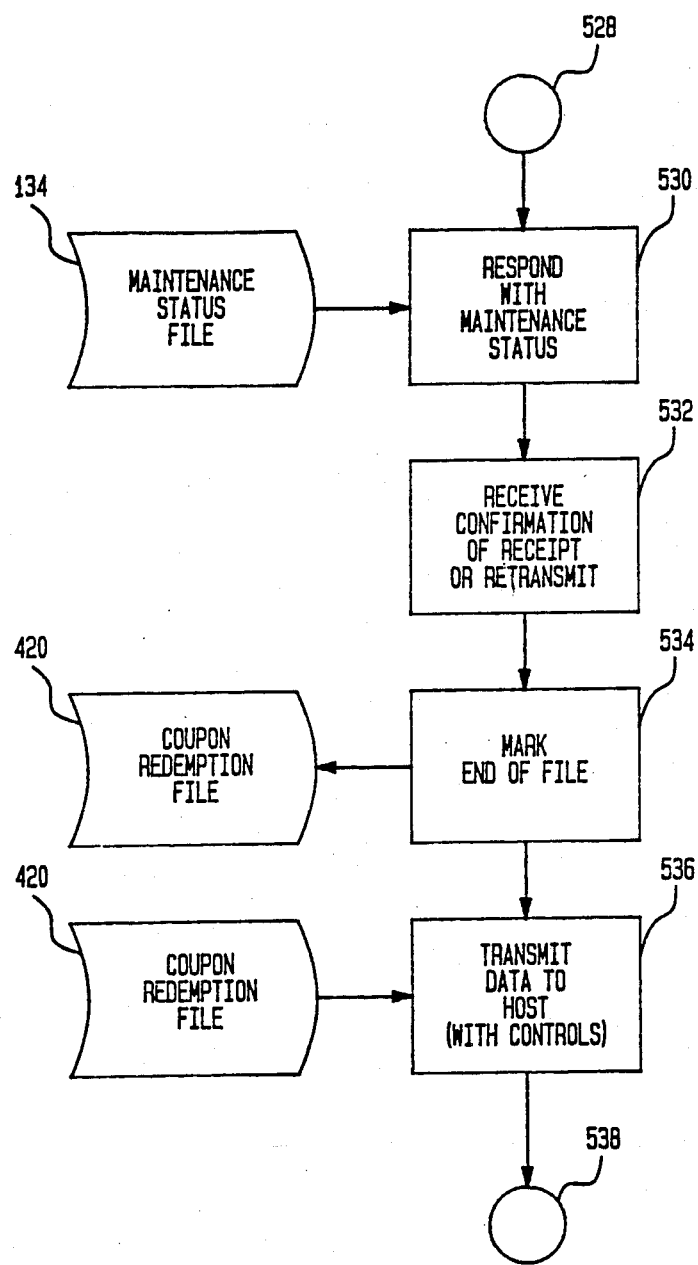

Connector 528 links FIGS. 35 and 36. At step 530 the CDR 20 responds to the CPU 16 with maintenance status as read from the maintenance status file 134.

At step 532, the CDR 20 receives confirmation of receipt from the CPU 16 or retransmits the message. At step 534, the CDR 20 marks the end of file and records this in the coupon redemption file 420. At step 536, the CDR 20 transmits the data to the CPU 16, with controls, as read from the coupon redemption file 420.

Figure 37:
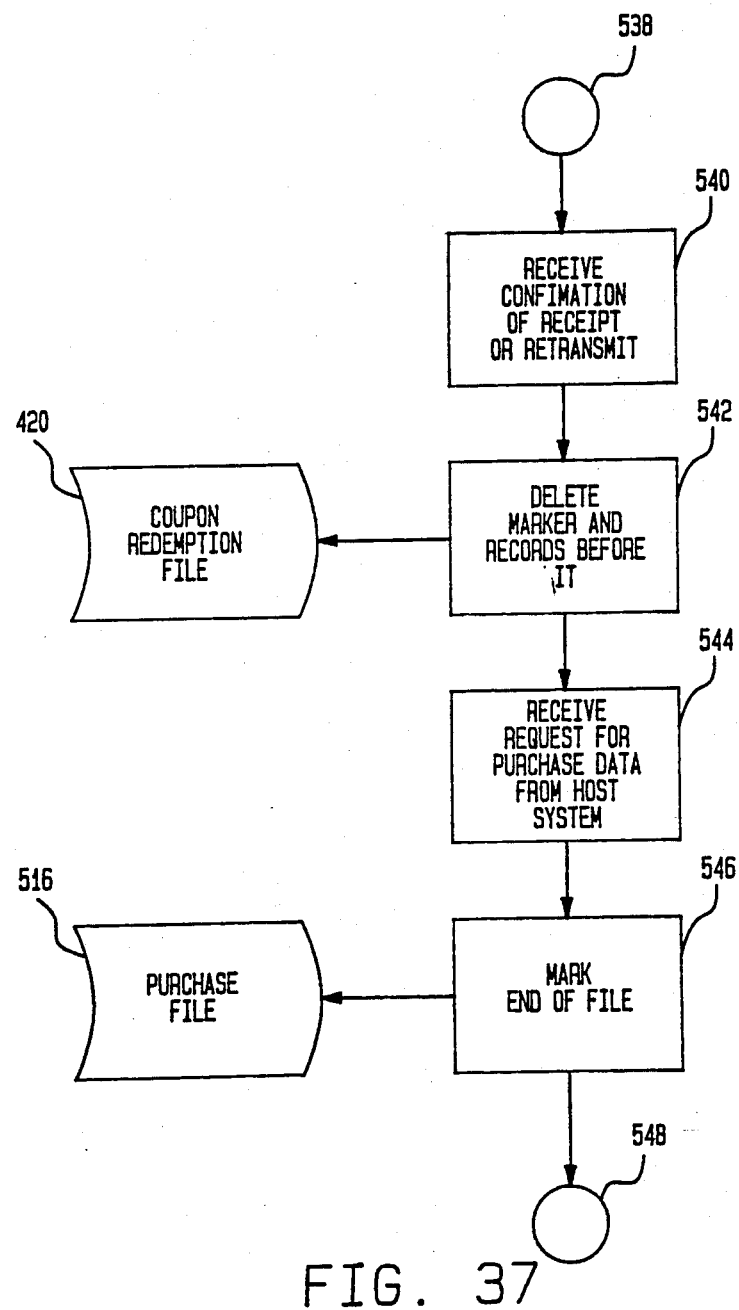

Connector 538 links FIGS. 36 and 37. At step 540, the CDR 20 receives confirmation of receipt from the CPU 16 or retransmits the message.

At step 542, the CDR 20 deletes the marker and the records before it in the coupon redemption file 420. At step 544, the CDR 20 receives a request for purchase data from the CPU 16. At step 546, the CDR 20 marks the end of the file and records this in the purchase file 516.

Figure 38:
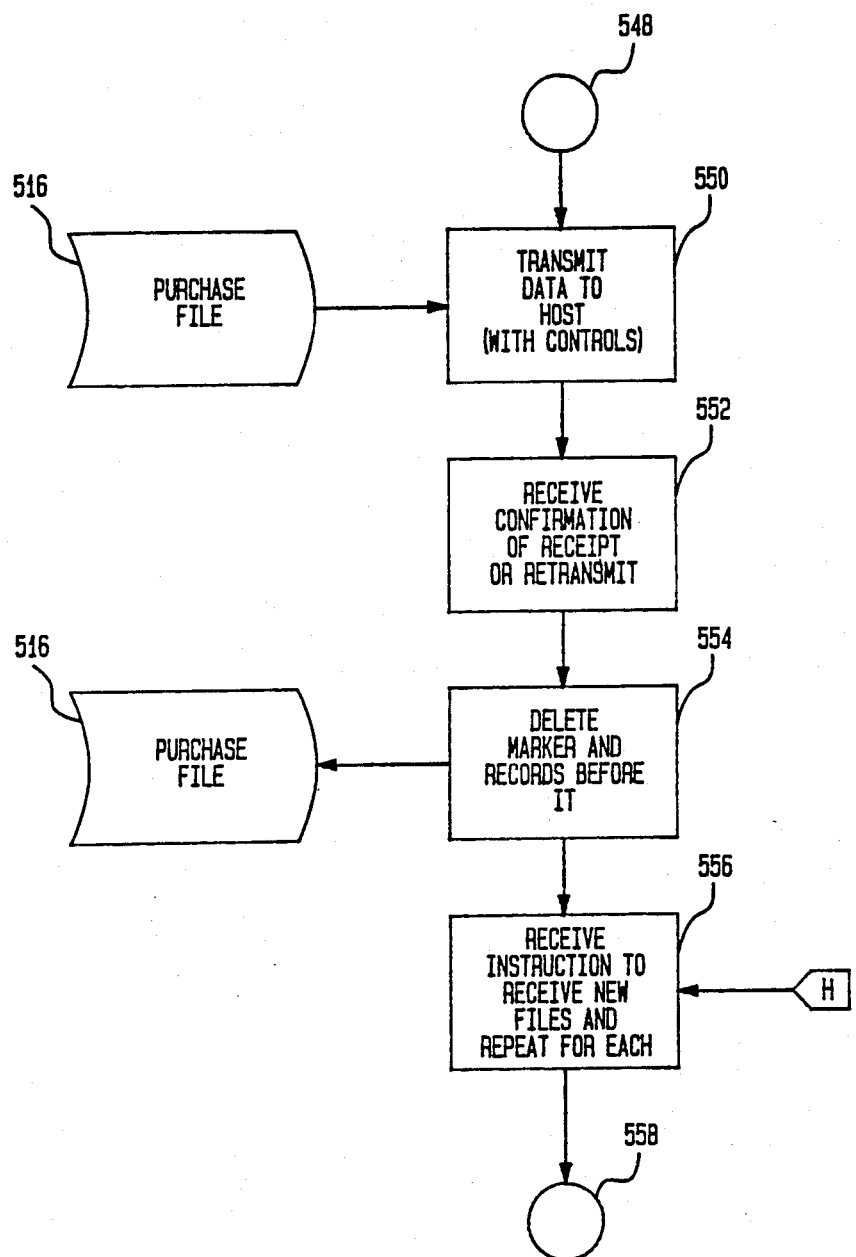

Connector 548 links FIGS. 37 and 38. At step 550, the CDR 20 transmits data up to the marker from the purchase file 516 to the CPU 16 (with controls). At 552, the CDR 20 receives confirmation of receipt from the CPU 16 or retransmits the message.

At step 554, the CDR 20 deletes the marker and the records before it in the purchase file 516 either immediately or at a later time. At step 556, the CDR 20 receives an instruction to receive new files. For each such file, the program performs the subroutine beginning at step 556 and ending at jump H in FIG. 40.

It should be noted that all references here and in other places to the definition of records may alternatively be deferred for some period of time to allow for backup and recovery.

Figure 39:
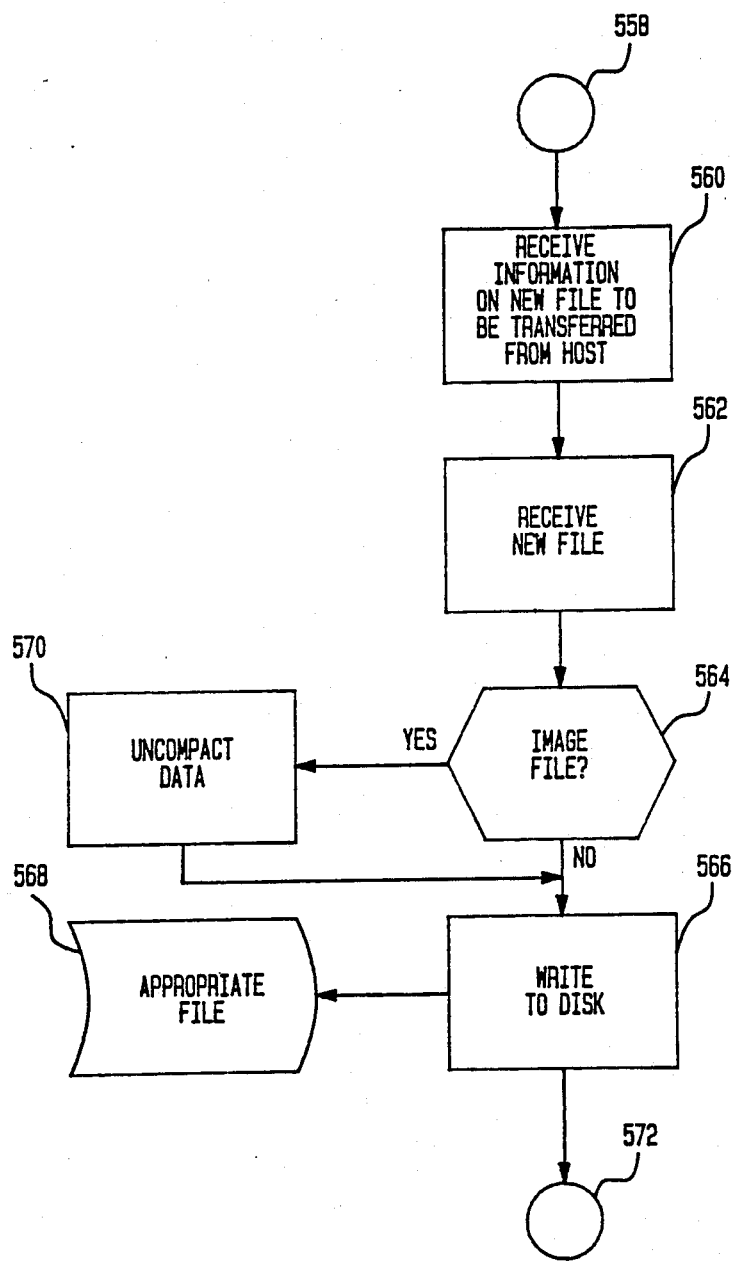

Connector 558 links FIGS. 38 and 39. At step 560, the CDR 20 receives information on a new file to be transferred from the CPU 16. This information includes transmission controls, file type and identification, the segment number (if multiple parts) and the dates for usage. At step 562 the CDR 20 receives the new file. The file may be one of the following types of files: image files, text overlay files, speech data files, parameter files and programs.

At 564 a determination is made whether an image file is included. If not, the information is written into the disk, as indicated at 566, in an appropriate file 568. If the determination made at step 564 reveals that an image file is included, the data optionally is first uncompacted, as indicated at 570, and then written into the disk, as indicated at step 566.

Figure 40:
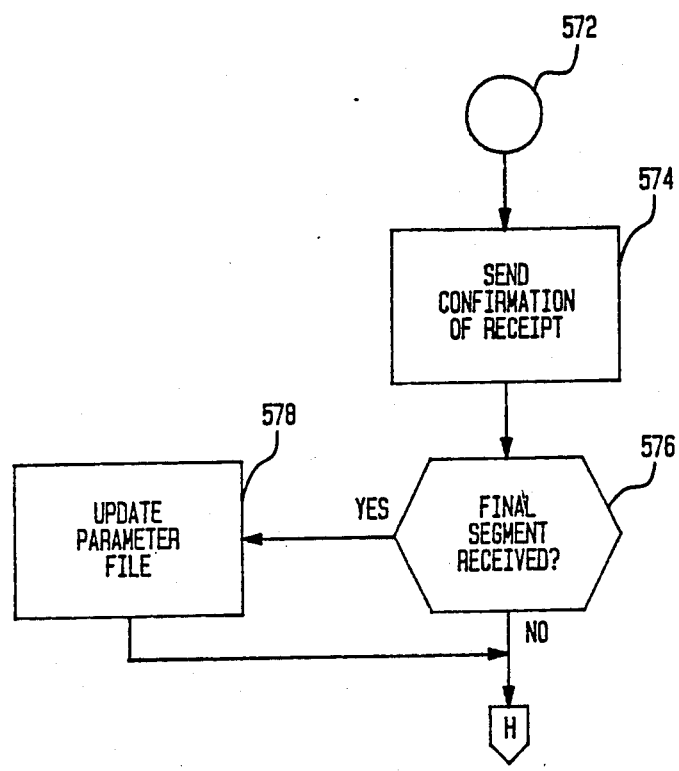

Connector 572 links FIGS. 39 and 40. The CDR 20 then sends confirmation of receipt, as indicated at 574. At step 576 a determination is made whether the final segment has been received. If not, the program immediately loops back to step 556 (FIG. 38) for the next file, as indicated by connector H. If the determination made at step 576 reveals that the final segment has been received, the parameter file 146 (not shown in FIG. 40) is first updated, as indicated at 578, and the program then loops back as indicated by connector H.

I. Modifications and Embellishments

In accordance with the invention, coupons can alternatively or additionally be distributed to customers at home. This would require the placement of local processing units in each limited geographic region where the service is offered. Consumers could call a local telephone number to contact the local processing unit (LPU). The LPU would advise the identified consumer of coupons offered that week. After choosing coupons, the consumer could also choose to shop for supermarket items on the system. After the customer hangs up, the LPU may send the user's file to the appropriate supermarket's CDR unit. The list of items to be purchased could also be sent to the central computer of the supermarket that was identified by the customer. To redeem chosen coupons, the customer would go to the supermarket which was designated when coupons were chosen. The same card number that was used during the selection process must be used on redemption to recall the coupons. Communications could be via a cable system, satellites, telephone, etc.

Many of the functions performed by the local CDR units 20 can be performed by the checkout system 18. For example, the National Semiconductor Datachecker/DTS 1100 POS Control System Processor when configured correctly, can perform communications, data storage, and manipulation functions among others. This may substantially decrease the cost of implementing the system in a store, since the processor controlling the checkout system would be necessary with or without the coupon system, and its presence would eliminate the need for a complex kiosk.

As a supplemental feature of the invention, surveys may be taken. By asking a customer a series of questions requiring a "touch" answer, the kiosk could take a survey, or poll voters, for example. Catalog sales may also be offered over the system, since the user's home address will be known. Also contemplated is the presentation of various sized coupons, and the presentation of coupons where a customer may choose a limited number of coupons. The latter may be useful where it is desired to increase the number of times a coupon is seen relative to the number of times it is chosen.

A "zoom" feature may be provided whereby, by touching a particular area on a first display screen, the customer causes that display to enlarge, or a set of additional related displays to appear. For example, if the first screen listed numerous categories of items, with pets as one category, touching the "pets" area on the screen may cause a series of pet coupons to be displayed. This would allow the inclusion of hundreds of coupons on the kiosk, without forcing the customer to stand at the kiosk for many minutes to review all available selections. Another application of this feature may be to display recipes when a certain coupon is chosen, and then to show the location or nutritional value of a particular item in the recipe when that item is touched.

The number of the receipt issued by the CDR unit 20 does not necessarily have to be the account number of the card which was used on coupon selection. It could be another number with fewer digits which is associated with the account number associated with the list of coupons chosen. This would decrease the time taken by the cashier to key enter the number on the receipt. Another possibility would be to print the number on the receipt in UPC code format so that it could be scanned rather than key entered. This would further decrease the time taken by the cashier to redeem the coupons. It would require a printer capable of printing UPC code with a density that would required to be read by a standard scanning system.

An alternative way of applying for the special card is for the customer to enter data through a specified side of the kiosk. The "keyboard" to enter name, address, etc. could be depicted on the screen, and the user could touch the "keys" to enter the data. The information would be stored locally until the next communication between the operations center 8 and the CDR unit 20.

An important feature of the invention is that a customer's demographic information may be magnetically encoded on the card such that when the customer is identified by CDR unit 20, possibly by spoken name, certain select coupons will be shown to the particular individual who meet preselected criteria. This would allow a manufacturer to give coupons to customers (for example) who chose another manufacturer's coupons the preceding week. It would also allow many coupons to be in the system, without displaying all coupons to all customers. As another example, the account number may indicate that a particular cardholder owns a dog. This affords an opportunity to display to the cardholder a selection of coupons appropriate for dog owners, while omitting such a display in the case of other cardholders who do not own dogs.

In accordance with the invention, all of the products purchased by a customer could be "saved" in a modified kiosk, or, alternatively, in the POS system storage. Those purchases could then be associated with the purchaser, whose name and data would be known.

Sensitive data communicated between the host and local unit may be encrypted. Furthermore, authorization capability for sensitive data (e.g. derived from the operations center) is also possible.

Non-scanning equipped stores that only have electronic cash registers could use the system by having cashiers key enter the UPC codes for the purchased products. This is already standard procedure in many supermarkets.

When an invalid card is inserted or an invalid use is attempted, there are several possibilities besides displaying a screen that describes the invalidity of the use. For example, if the notation indicates that the user accessed the system in that type of retail outlet during that week (or other predetermined time period), a second notation may be made on a magnetic strip of card indicating one attempted invalid use. A single screen may then appear explaining the reason why the card is not valid in that type of store for the remainder of the week. If the user then attempts to use the same card a third time, in the same type of outlet that week, a third note may be made on the magnetic stripe which permanently invalidates the card in all retail stores. Alternatively, the card reader may simply "swallow", or refuse to disgorge, the inserted card. In either case the user will then see an explanation on the screen of the action that has been taken as a result of the user's attempts to circumvent the system.

If the notation on the card indicates that the user accessed the system in a specific retail outlet during that week (or other predetermined time period), the unit may retrieve the user's file and list coupons already chosen and not redeemed. It may also re-offer coupons which were not chosen. It would not re-offer coupons that have already been redeemed. If the card was already used during that period in the same type of retail outlet then a screen is displayed to inform the user that use of the card in that type of retail outlet is not possible until the beginning of the next time period but that use of the card is possible in another type of retail store. New instructions for the display of new coupons may be stored and retrieved when the limit on the distribution of a particular coupon has been reached.

The system may be "on-line" wherein constant communications between an operations center and local stations would allow customers to use various supermarket CDR units within one week, because their prior selections can be retrieved from the operations center. Each user could also be specifically identified by last week's purchases or coupons or any other variable that is stored in the substantial data base in the operations center.

It is further contemplated that the CDR unit 20 may contain a scanner capable of reading paper coupons with UPC codes. After inserting the card, a customer would insert paper coupons into a slot, similar to the ones used in dollar bill change machines. The UPC code on the coupons would be read, and then would be added to the electronic list of coupons available for redemption when the card is presented at the checkout. This would integrate currently used systems into the invention while significantly improving such systems by substantially reducing redemption and clearing costs. Once inserted and read, paper coupons would be destroyed by the CDR unit.

A still further possibility is that information regarding the coupons selected by a customer could be recorded on the customer's special card at the time of coupon selection. The information recorded on the card could then be read directly at the checkout station for redemption and subsequent clearing.

J. Summary

Thus there is provided in accordance with the invention a novel, highly-effective and efficient method for distributing, redeeming and clearing coupons. The invention solves the problems of the prior art noted above by increasing coupon redemption rates, reducing the cost of coupon issuance, redemption and clearing, eliminating the misredemptions characteristic of conventional systems, and providing other benefits as noted above.

The invention is particularly adapted for distributing, redeeming and clearing coupons of the "cents-off" kind used to promote the sale of merchandise in supermarkets, drugstores and hardware stores. The invention can also be employed in conjunction with coupons offering substantial discounts, amounting, for example, to several or many dollars. Such coupons may for example be used to promote airline travel, car rental, reservations in a particular hotel, etc. The invention can moreover be employed in conjunction with coupons offering free goods and services.

Many modifications of the preferred embodiments of the invention disclosed above will readily occur to those skilled in the art upon consideration of this disclosure. For example, the specific hardware components described above are merely exemplary, and other components can readily be substituted therefor without departing from the spirit and scope of the invention. Similarly, the program steps as outlined in the flowcharts are merely exemplary, and other programs or even hard-wired apparatus for accomplishing the same purposes can be developed by those skilled in the art having the benefit of this disclosure.

What is claimed is:

1. A paperless system for distributing and redeeming coupons and the like, said apparatus comprising
    display, selection and recording means for presenting to a customer a display of coupons, for enabling the customer to make a selection of coupons from the display, and for recording the selection, said display, selection and recording means further including means for generating a first signal identifying the customer and his/her coupon selection,
    identification and checkout means for identifying the customer at a store checkout station as the one who made the selection and for generating a second signal identifying items purchased in the store by the customer,
    matching means coupled to said display, selection and recording means and responsive to said first and second signals for determining any matches between the coupons selected and the items purchased,
    and means for crediting the customer in accordance with the terms of the matched coupons.

2. A paperless system according to claim 1 including clearing means responsive to said matching and crediting means for debiting the issuer of the matched coupons and crediting the store at which the coupons were redeemed.

3. A paperless system according to claim 1 wherein said display, selection and recording means comprises a video monitor for presenting said display and a touch screen for enabling said customer to make said selection.

4. A paperless system according to claim 1 wherein said display, selection and recording means further comprises printing means for printing a receipt listing said selections and issuing said receipt to said customer as a shopping aid.

5. A paperless system according to claim 4 wherein said receipt includes a receipt number which can be entered in said identification and checkout means in order to identify said customer as the one who made said selection and to enable call-up of said selection from said display, selection and recording means.

6. A paperless system according to claim 1 wherein said display, selection and recording means comprises a plurality of electronic display screens, at least a first of said screens being dedicated to a use including display of said coupons.

7. A paperless system according to claim 6 further comprising means facilitating identification of customers to said display, selection and recording means, wherein at least one of said screens is dedicated to the presentation of a display facilitating applications by customers for said identification means.

8. A paperless system according to claim 1, wherein said display, selection and recording means includes means for recording data on a card associated with a customer.

9. A paperless system according to claim 8, wherein said display, selection and recording means includes means for identifying a customer identification code on said card.

10. A paperless system according to claim 8, wherein said display, selection and recording means further includes control means responsive to data previously recorded on a customer card.

11. Apparatus according to claim 10, wherein said last name means is capable of preventing coupon selection by said customer.

12. Apparatus according to claim 1 wherein said identification and checkout means comprises an automated scanning checkout system.

13. Apparatus according to claim 1 wherein said matching and crediting means comprises an automated scanning checkout system.

14. Apparatus according to claim 1 comprising means for obtaining demographic data about users of said apparatus, means for correlating said demographic data with said selections, and means for periodically generating reports based on said correlations.

15. A paperless system for distributing and redeeming cents-off merchandise coupons and the like, said system comprising
a central processing unit,
a data entry system for entering into said central processing unit alphanumeric data relating to coupons to be distributed,
an image capture system for supplying digitized image data relating to said coupons to said central processing unit,
a local coupon distribution and redemption unit at a store connected to said central processing unit for receiving said alphanumeric and image data and electronically displaying and distributing coupons corresponding to said data,
an electronic checkout system connected to said coupon distribution and redemption unit for receiving signals from a remote coupon selection means regarding a customer's coupon selection and for receiving signals regarding the items purchased by said customer in said store, and
card reading means cooperating with both said distribution and redemption unit and said checkout system, said distribution and redemption unit, checkout system and card reading means cooperating to issue coupons only to holders of a predetermined card and to match coupon selections of each such holder to purchases made in that store by the holder, whereby the holder is electronically credited with the value of the coupons selected in accordance with the terms of each coupon.

16. A paperless system according to claim 15 comprising security means for detecting attempted invalid use of said card, for preventing such invalid use, and for communicating the action taken to the holder attempting such invalid use.

17. A paperless system according to claim 15 comprising security means for detecting attempted invalid use of said card, for invalidating said card in response to such attempted invalid use, and for communicating the action taken to the holder attempting such invalid use.

18. A paperless system according to claim 17 wherein said card includes a magnetic stripe and said security means comprise means for recording an invalidating mark on said magnetic stripe in response to such attempted invalid use.

19. A paperless system according to claim 15 comprising means for limiting the number of times said card can be used under preselected circumstances.

20. A paperless system according to claim 19 wherein said means for limiting the number of times said card can be used in a particular type of store for unit of time comprises means for recording the date of a given use of a given card in a particular type of store,
means for ascertaining the date of a subsequent attempted use of the same card in the same type of store, and
means for invalidating said subsequent attempted use if said comparison of dates indicates that the time elapsed since said given use is less than a predetermined interval.

21. A paperless system according to claim 15 wherein said card is a conventional credit card issued to a plurality of credit card holders under different account numbers, each credit card having a magnetic stripe.

22. A paperless system according to claim 15 wherein said card comprises a special card issued to a plurality of holders under different account numbers, each card having a magnetic stripe, and means in said central processing unit for storing said account numbers and demographic data relating thereto and for generating periodic reports including demographic data about purchases of said items.

23. A paperless system according to claim 15 including means for limiting the number of coupons for a particular item distributed in a given store in a given time period.

24. A paperless system according to claim 23 wherein said means for limiting the number of coupons for a particular item distributed in a given store in a given time period comprises means in said local unit for storing a number corresponding to the maximum number of a particular coupon authorized for distribution in that store during that time period, counting means for counting the number of selections of that coupon, means for comparing the stored number and the number counted by said counting means, and means actuated when said stored number and said counted number are equal for preventing further distribution of said coupon during said time period.

25. A paperless system for distributing, redeeming and clearing coupons and the like of an issuing entity, said apparatus comprising display, selection and recording means for presenting to a customer a display of coupons, for enabling the customer to make a selection of coupons from the display, and for recording the selection, said display, selection and recording means further including means for generating a first signal identifying the customer and his/her coupon selection, identification and checkout means for identifying the customer at a store checkout station as the one who made the selection and for generating a second signal identifying items purchased in the store by the customer, matching and crediting means coupled to said display, selection and recording means and responsive to signals received therefrom for determining any matches between the coupons selected and the items purchased and for crediting the customer in accordance with the terms of the matched coupons, and central processing means responsive to said matches for debiting said issuing entity and crediting said store with respect to said matched coupons.

\* \* \* \* \*